United States Patent
Tankersley et al.

(10) Patent No.: US 11,169,516 B2
(45) Date of Patent: Nov. 9, 2021

(54) ADAPTIVE RATE GAIN CONTROLLER

(71) Applicant: GoPro, Inc., San Mateo, CA (US)

(72) Inventors: Benjamin Tankersley, San Mateo, CA (US); Joseph Anthony Enke, San Francisco, CA (US); Donald Allen Severns, San Mateo, CA (US)

(73) Assignee: GoPro, Inc., San Mateo, CA (US)

(*) Notice: Subject to any disclaimer, the term of this patent is extended or adjusted under 35 U.S.C. 154(b) by 17 days.

(21) Appl. No.: 15/707,029

(22) Filed: Sep. 18, 2017

(65) Prior Publication Data
US 2018/0081351 A1  Mar. 22, 2018

Related U.S. Application Data

(60) Provisional application No. 62/396,095, filed on Sep. 16, 2016, provisional application No. 62/411,604, filed on Oct. 22, 2016.

(51) Int. Cl.
*G05D 1/00* (2006.01)
*B64C 39/02* (2006.01)
(Continued)

(52) U.S. Cl.
CPC .......... *G05D 1/0011* (2013.01); *B64C 39/024* (2013.01); *G03B 15/006* (2013.01);
(Continued)

(58) Field of Classification Search
None
See application file for complete search history.

(56) References Cited

U.S. PATENT DOCUMENTS

| | | | |
|---|---|---|---|
| 2004/0093130 A1* | 5/2004 | Osder | B64C 27/18 701/3 |
| 2006/0061306 A1* | 3/2006 | O'Gorman | H02P 6/10 318/105 |

(Continued)

FOREIGN PATENT DOCUMENTS

WO  WO-2015180171 A1 * 12/2015  .......... G05D 1/0858

OTHER PUBLICATIONS

Hiroshi Ito and Zhong-Ping Jiang, "Output feedback disturbance attenuation with robustness to nonlinear uncertain dynamics via state-dependent scaling," Proceedings of the 40th IEEE Conference on Decision and Control (Cat. No. 01CH37228), Orlando, FL, USA, 2001, pp. 2772-2777 vol. 3. (Year: 2001).*

*Primary Examiner* — Christian Chace
*Assistant Examiner* — Katherine Marie Fitzharris
(74) *Attorney, Agent, or Firm* — Young Basile Hanlon & MacFarlane, P.C.

(57) ABSTRACT

An aerial vehicle comprises one or more sensors to environmental data, a communication system to receive control inputs from a user, two or more actuators, with each actuator coupled to a rotary wing. The aerial vehicle also comprises a controller to determine a mode of the aerial vehicle based on the environmental data and the control inputs, each mode indicating a set of flight characteristics for the aerial vehicle, generate a gain value based on the mode, the gain value, when used to modify power signals transmitted to actuators of the aerial vehicle, causing the aerial vehicle to conform within the indicated flight characteristics of the determined mode, generate an output signal modified by the gain value based on the input signal, and transmit a power signal based on the output signal to each actuator of the aerial vehicle.

20 Claims, 9 Drawing Sheets

(51) Int. Cl.
*G05D 1/08* (2006.01)
*G03B 15/00* (2021.01)

(52) U.S. Cl.
CPC ......... *G05D 1/0038* (2013.01); *G05D 1/0858* (2013.01); *B64C 2201/042* (2013.01); *B64C 2201/108* (2013.01); *B64C 2201/127* (2013.01); *B64C 2201/146* (2013.01)

(56) References Cited

U.S. PATENT DOCUMENTS

| | | | | |
|---|---|---|---|---|
| 2008/0046137 | A1* | 2/2008 | Shue | B64C 13/16 701/10 |
| 2013/0320133 | A1* | 12/2013 | Ratti | B64C 33/02 244/22 |
| 2014/0129056 | A1* | 5/2014 | Criado | G05D 1/105 701/4 |
| 2016/0068267 | A1* | 3/2016 | Liu | B64C 39/024 701/11 |

* cited by examiner

ADAPTIVE RATE GAIN CONTROLLER

CROSS REFERENCE TO RELATED MATTERS

This application claims the benefit of U.S. Provisional App. No. 62/396,095, filed Sep. 16, 2016, and U.S. Provisional App. No. 62/411,604, filed Oct. 22, 2016, both of which are incorporated by reference in their entirety.

TECHNICAL FIELD

The disclosure generally relates to the field of flight controller systems, for example, adaptive gain rate control in flight controller systems.

BACKGROUND

A controller system, such as a flight controller system, may interface with one or more sensors and one or more actuators. Flight controller systems are commonly used in remote controlled aerial vehicles (e.g., drones). These remote controlled aerial vehicles are in turn commonly used in cinematography tasks. For example, the remote controlled aerial vehicle may be coupled to an imaging device, such as a digital video camera, and be used to film different scenes. Different cinematography tasks may adhere to different requirements, such as with panning speed, stabilization, and so on. However, contemporary remote controlled aerial vehicle do not account for these changes in requirements, and thus the resulting operation of the remote controlled aerial vehicle is subpar and produces an inferior quality video product, as well as being sub-optimal in many use cases. This results in various issues, such as jitter, a "jello" effect, and horizon drift in the resulting videos captured on such vehicles.

BRIEF DESCRIPTION OF DRAWINGS

The disclosed embodiments have advantages and features which will be more readily apparent from the detailed description, the appended claims, and the accompanying figures (or drawings). A brief introduction of the figures is below.

DETAILED DESCRIPTION

Figure 1:
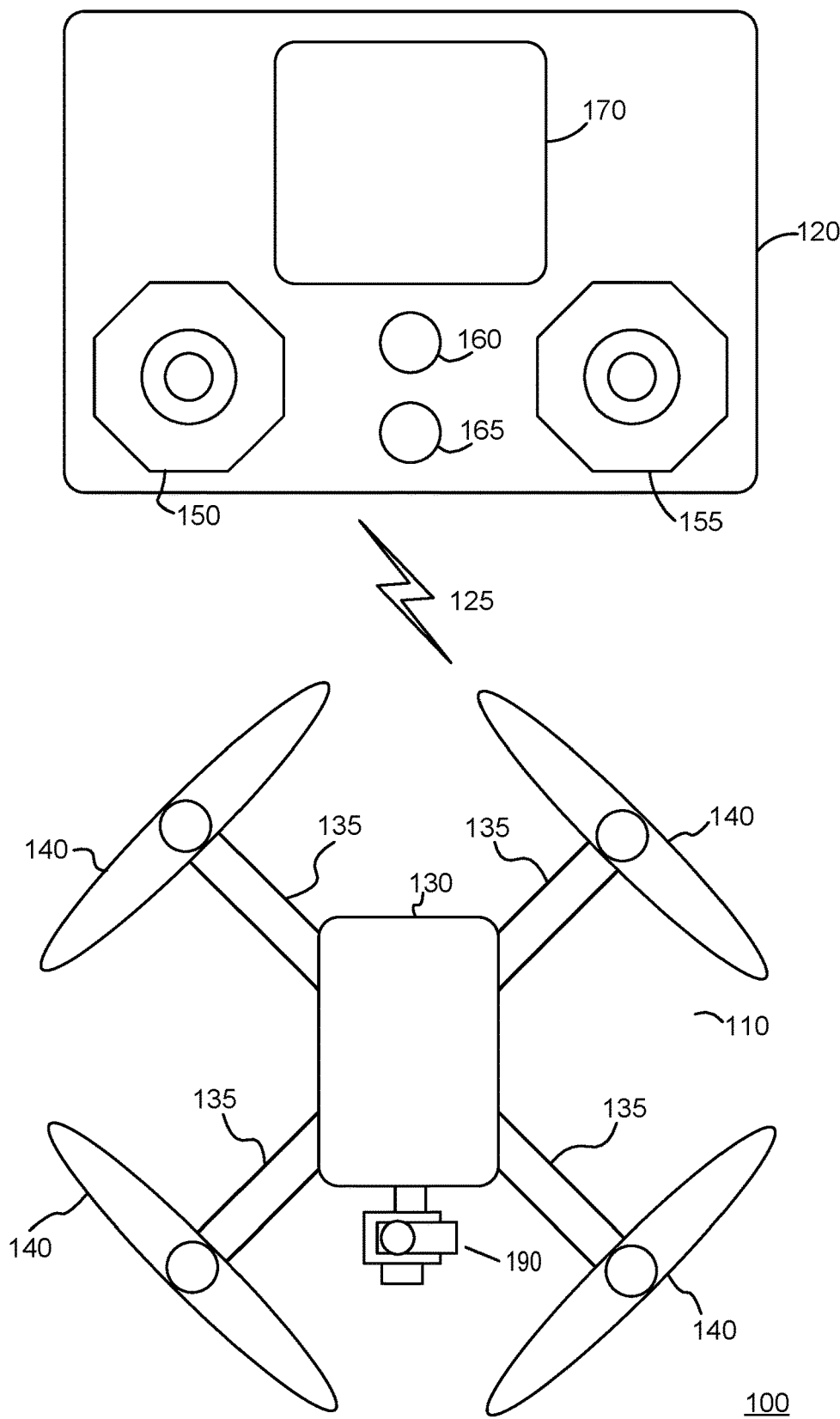
FIG. 1 illustrates an example configuration of a remote controlled aerial vehicle in communication with a remote controller, according to one example embodiment.

The Figures (FIGS.) and the following description relate to preferred embodiments by way of illustration only. It should be noted that from the following discussion, alternative embodiments of the structure and methods disclosed herein will be readily recognized as viable alternatives that may be employed without departing from the principles of what is claimed.

Reference will now be made in detail to several embodiments, examples of which are illustrated in the accompanying figures. It is noted that whenever practicable, similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

A controller system, such as a flight controller, may interface with one or more sensors and one or more actuators. The controller system may include one or more modules which may be organized into a pipeline. Modules of the same type may execute in parallel while modules of different types may execute in sequence. Each module of the controller system may take input synchronously from a preceding module and output one or more signals to a following module. An execution time of each module may be constant.

The pipeline may include one or more drivers, one or more filters, a combine, one or more estimators, one or more controllers, a mixer, and one or more actuator controllers. The drivers may be configured to receive sensor data and to pre-process the received sensor data. The filters may be configured to filter the pre-processed sensor data to generate filtered sensor data. The combine may be configured to package the filtered sensor data to generate packaged sensor data. The estimators may be configured to determine estimates of a position of a vehicle based on the packaged sensor data. The controllers may be configured to generate control signals based on the determined estimates. The mixer may be configured to modify the generated control signals based on limitations of the vehicle. The actuator controllers may be configured to generate actuator control signals based on the modified control signals.

The controllers may be capable of adapting the gain from the control input signal (e.g., from a remote control) to the actuators based on the input from the sensors in a coupled aerial vehicle, such as remote controlled aerial vehicle. In the case of the aerial vehicle, the actuators may correspond to motors that power the rotors/propellers of the aerial vehicle. The purpose of modifying the gain is to achieve optimal flight characteristics (e.g., jitter within a certain threshold, acceleration within a certain threshold) for different modes of operation of the aerial vehicle (e.g., wide angle cinematography, action cinematography, zooming, panning, movement in-between shots, etc.). The different modes may be detected based on the input from the sensors and the control inputs.

Thus, the output power to the actuators may be a function of the sensor inputs and the control inputs, with the purpose of achieving optimal flight characteristics for different modes. Unlike a contemporary aerial vehicle which ignores flight characteristics and presents a constant gain, optimizing for flight characteristics allows for performance from the aerial vehicle that can produce more visually pleasing cinematography and an increase in positive user feedback in the use of the aerial vehicle.

Example System Configuration

The descriptions herein are in the context of a remote controlled aerial vehicle (or drone), for example, a rotary wing (or rotary blade), such as a quadcopter or helicopter, a fixed wing aircraft, a turbojet aircraft, or a rocket propelled aircraft. However, disclosed configurations may apply to other remote controlled vehicles, such as boats and cars. In addition, the remote controlled vehicles may have hobby sized form factors. Remote control aerial vehicles may sometimes be referred to as unmanned aerial vehicles (UAVs) or drones and in this context may include camera units/hardware for capturing images and/or videos.

Turning now to FIG. 1, it illustrates an example aerial capture platform (or system) 100. The aerial capture platform 100 may include a remote controlled aerial vehicle 110 in communication with a remote controller 120. The aerial vehicle 110 and the remote controller 120 may be communicatively coupled through a wireless link 125. The wireless link 125 may be a Wi-Fi link, cellular (e.g., long term evolution (LTE), 3G, 4G, 5G) or other wireless communication link (e.g., Bluetooth, Zigbee). In this example, the aerial vehicle 110 is illustrated as multi-rotary blade aerial vehicle. Here, the multi-rotary blade aerial vehicle is illustrated with four rotary blades, and thus, also may be referenced as a quadcopter. Also in this example, the remote controller 120 is illustrated as a dedicated remote controller, but the principles described herein may apply to other devices that may operate as a remote controller, for example, a smartphone, tablet, and/or a laptop.

The aerial vehicle 110 in this example includes a housing (or body) 130, a gimbal 190, two or more arms 135, and two or more propellers 140 (which may be in an orientation different from the depicted orientation). The housing 130 may have one or more cavities for a payload. The payload may include, for example, electronic circuitry (e.g., controls and processing components), batteries, and/or sensors. The payload may include mechanisms such as a parachute. The parachute may be in a portion of the housing 130 that may open so that the parachute may deploy in certain predetermined situations. The parachute and/or corresponding portion of the housing 130 may couple with electronics that may provide the logic for deployment of the parachute. The housing 130 may include a communication subsystem (which may include corresponding electronics and/or firmware) and a control subsystem (which may include corresponding electronics and/or firmware). The communication subsystem may be used to wirelessly communicate with a remote controller (e.g., the remote controller 120) or other interfaces on the aerial vehicle 110. The control subsystem may be used/configured to control operations of various systems on the aerial vehicle 110, for example, a power system, a flight operation system and other such systems.

In one embodiment, depending upon a mode that the aerial vehicle is in, the control subsystem dynamically adapts the gain on the power signal that is sent to the thrust motors which drive the propellers 140 in order to ensure optimal flight characteristics depending upon the mode. Each mode (e.g., wide angle cinematography, high speed movement) defines a certain type of function of the aerial vehicle, and may depend on a particular use case. Different use cases may require different flight characteristics from the aerial vehicle, in order to reduce different types of undesirable responses from the aerial vehicle. These flight characteristics may include limiting, setting to within a threshold, or otherwise conforming various characteristics of the aerial vehicle to set ranges. These characteristics may include speed, acceleration, judder, yaw, pitch, roll, altitude, position, and so on. The control subsystem may be able to dynamically determine using sensors or receive instructions regarding the current mode of the aerial vehicle, and respond with an adjustment to the signal being sent to the thrust motors. Additional details regarding the communication subsystem and the control subsystem are described further in detail with respect to FIG. 2.

The gimbal 190 is a structure providing a stable mounting point for additional components. The gimbal 190 itself may be removably (or releasably) mounted within an opening on the housing 130 of the aerial vehicle 110. Further by example, when removed from the aerial vehicle 110, the gimbal 190 may be mounted on another structure, for example, a pole mount. The gimbal 190 may couple with a removable camera frame. Alternately, the gimbal 190 may be integrated with the housing 130. The gimbal 190 also may include a camera secured directly with it or through the camera frame. The camera frame may be removed and fitted for the particular camera that couples with it. Alternately, the camera frame may be integrated with the gimbal. The gimbal 190, in some embodiments, allows an object (e.g., the camera) secured/supported by the gimbal to remain independent of the rotation of the housing 130 to which the gimbal 190 is mounted. This allows objects which are sensitive to motion, e.g., a camera, to be mounted on the aerial vehicle without being affected as significantly by rotational movement from the aerial vehicle.

Each arm 135 of the aerial vehicle 110 may be removably coupled with the housing 130. In addition, each arm 135 is movable and may fold or pivot/rotate toward the housing 130 when the aerial vehicle 110 is not operational for flight and may fold back away from the housing 130 when the aerial vehicle 110 is operational for flight. The arm 135 may be comprised of multiple members, with each member independently foldable or rotatable. In addition, each arm 135 includes a thrust motor (which may include a rotor) that may mechanically, and removably, couple with a propeller 140 to create a rotary assembly.

The thrust motor spins the propeller 140 in an appropriate direction to allow the aerial vehicle 110 to move based a command that is executed, e.g., by a controller. For example, when the rotary assembly is operational, all the propellers 140 spin in appropriate directions and/or at speeds to allow the aerial vehicle 110 to lift (take off), tilt, turn, land, hover, and/or otherwise move (up, down, forward, reverse (or backward), etc.) in flight. In one embodiment, each propeller may also have adjustable pitch. The profile of the propellers 140 may be designed such that they support an optimal or lowest possible RPM (rotations per minute) that is needed to achieve the lift and other flight characteristics of the aerial vehicle (e.g., speed). This, in combination with the variable gain as described above, allows the aerial vehicle to achieve the desired flight characteristics while minimizing noise. The quiet operation of the aerial vehicle in this fashion is advantageous as it reduces vibrational effects on any video recording, and allows the video recording to record cleaner audio from the aerial vehicle directly without interference from rotor and motor noises. To achieve a lower RPM, the rotors may be lengthened (e.g., to the maximum length possible without interfering with other rotors), ducted, the number of blades may be increased, the area of the blades may be increased, the pitch of the blades may be increased, and so on.

In addition the aerial vehicle 110 may include landing gear (not shown) on an underside of the housing 130. The landing gear may be configured to fold toward the housing 110 when the aerial vehicle 110 is in flight. The landing gear may extend outward away from the housing 110 when the aerial vehicle 110 is at rest on a surface.

The remote controller 120 may include a first control panel 150 and a second control panel 155 (collectively referred to as "control panels 150, 155"), an ignition/start button 160, a return button 165 and a display 170. It is noted that more or less control features and buttons may be included (e.g., a shutdown button, autopilot button, etc.). The remote controller 120 may be used to control operation of the aerial vehicle 110. This operation may include pitch, roll, and yaw control, as well as control for translation in three dimensions (e.g., up, down) for the aerial vehicle 110 in addition to other functions.

The control panels 150, 155 may be used by a user to initiate control operations. The control panels 150, 155 may be mechanical (e.g., joystick, roller ball, etc.) or solid state (e.g., touch pad). For example, the first control panel 150 may be used (in part) to control "up-down" direction (e.g. lift and landing) of the aerial vehicle 110. The second control panel 155 may be used (in part) to control "forward-reverse" (e.g., thrust/drag) direction of the aerial vehicle 110. In addition, a combination of the control panels 150, 155 with another controller mechanism (e.g., a wheel), may be used for "left-right" and/or hover movement. It is noted that these are just examples and that the control panels 150, 155 may be assigned other or different functions (e.g., yaw, pitch, roll).

The ignition button 160 may be used to remotely turn on and/or start (as well as turn off and/or pause operation of) the aerial vehicle 110 components. For example, a single press of the ignition button 160 may start operation of a first set of components (e.g., sensors and lighting) on the aerial vehicle 110, a second press may start operation of a second set of components (e.g., the rotary assembly (e.g., start the propellers 140)), on the aerial vehicle 110, and holding the ignition button 160 for a certain period of time (e.g. 5 secs) may shut down the aerial vehicle 110. The return button 165 (or the return to home (RTH) or come home button) may be used to override the controls of the remote controller 120 and transmit instructions to the aerial vehicle 110 to return to a predefined location.

The ignition button 160 and the return button 165 may be mechanical and/or touch sensitive (non-mechanical) buttons. In addition, each button 160, 165 may be illuminated with one or more light emitting diodes (LED) to provide additional details. For example, the LED may switch from one visual state (e.g., color) to another to indicate with respect to the ignition button 160 whether the aerial vehicle 110 is ready to fly (e.g., lit green) or not (e.g., lit red). The LED also may provide visual indicators corresponding to aerial vehicle 110 operation in flight, for example, if it is in an override mode on return path (e.g., lit yellow) or has a battery power level below a predefined threshold (e.g., lit green when above a first threshold, lit yellow when just below that threshold, and lit red below a lower threshold). It also is noted that the remote controller 120 may include other dedicated hardware buttons and/or switches and those buttons and switches may be mechanical and/or solid state buttons and switches. For example, another button may be added to transmit signals/instructions to the aerial vehicle 110 to deploy the parachute.

The remote controller 120 may include dedicated buttons corresponding to functions on the remote controlled aerial vehicle 110, for example, a camera shutter button for signaling (or triggering) taking still or video images, changing image capture resolution, changing frame rate, etc. Other buttons can be used for functions such as camera controls, including control settings, for example, tagging images, transmitting (or sharing) captured images, etc.

The remote controller 120 may include a screen (or display) 170. The screen 170 provides for visual display. The screen 170 may be a touch sensitive screen. The screen 170 may be, for example, a liquid crystal display (LCD), an LED display, an organic LED (OLED) display, or a plasma screen, etc. The screen 170 may allow for display of information related to the remote controller 120, for example, menus for configuring the remote controller 120 and/or remotely configuring the aerial vehicle 110, and/or controlling a camera and/or gimbal 190 coupled with the aerial vehicle 110. The screen 170 can display images or video captured from a camera coupled with the aerial vehicle 110.

Example Electronics and Control System for Aerial Vehicle

Figure 2:
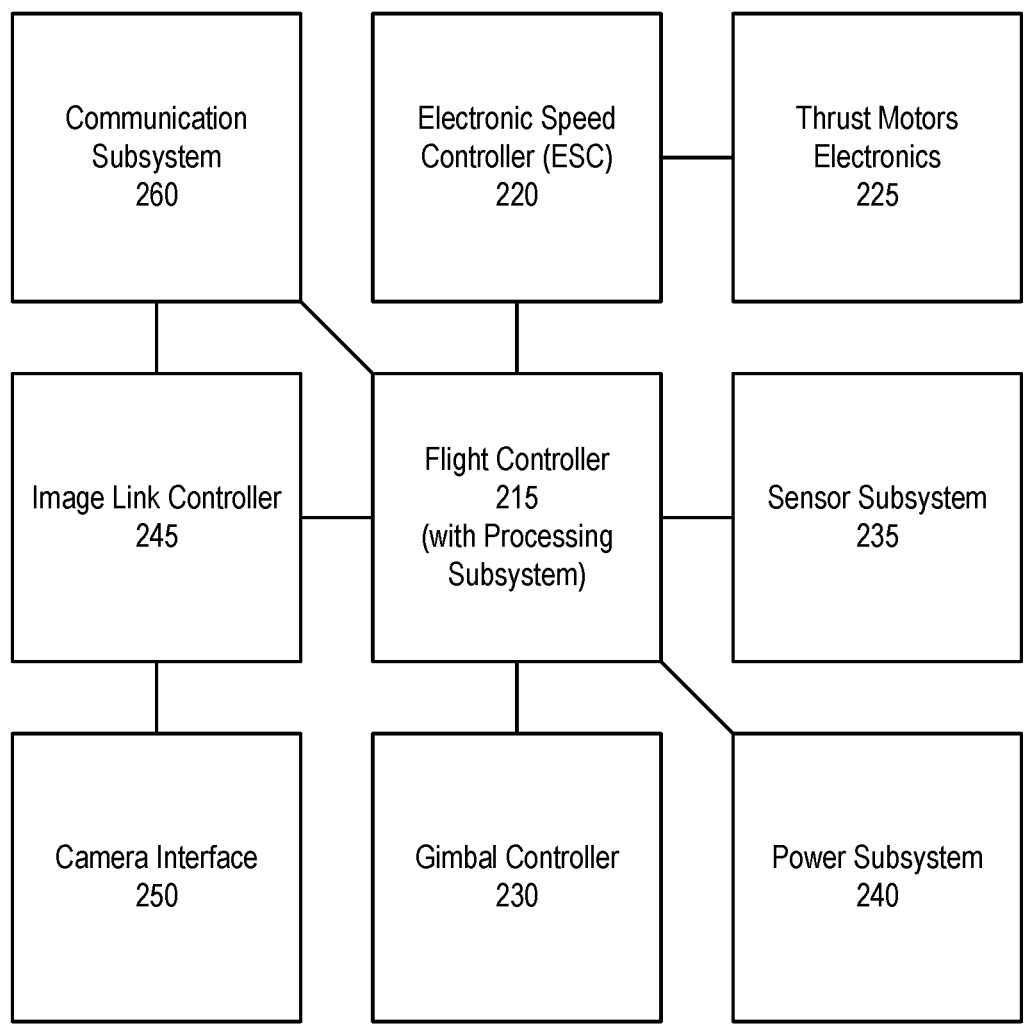
FIG. 2 illustrates an example of aerial vehicle electronics and control systems, including a controller capable of adaptively determining the gain value for actuator control, according to one example embodiment.

FIG. 2 illustrates an example embodiment of an electronics and control (EC) system 210 of the aerial vehicle 110, including a controller capable of adaptively determining the gain value for actuator control, according to one example embodiment. The example EC system 210 may include a flight controller 215, an electronic speed controller (ESC) 220, one or more thrust motors electronics 225, a gimbal controller 230, a sensor subsystem (which may include telemetric subsystems) 235, a power subsystem 240, an image link controller 245, a camera interface 250, and a long range communication subsystem 260. The components may communicate directly or indirectly with each other through a data bus within the aerial vehicle 110 (e.g., the bus 708 of FIG. 7).

Figure 7:
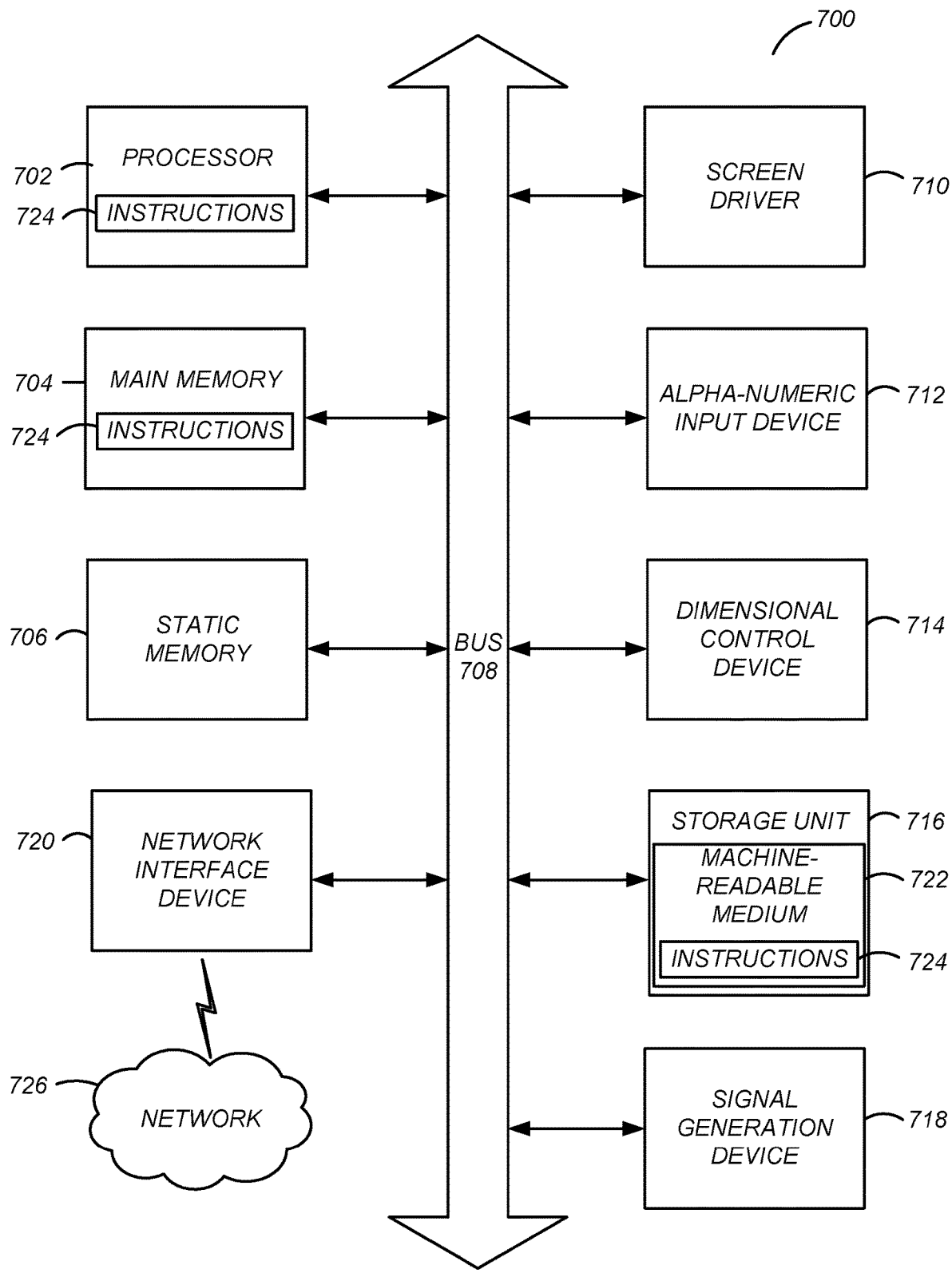
FIG. 7 illustrates an example machine for use with a system of an aerial vehicle, according to one example embodiment.

The aerial vehicle 110 components may be embodied in hardware, software, or a combination thereof. The software, which may include firmware, may be referenced as program code, computer program product, or program instructions, and may be comprised of one or more instructions. Software may include an operating system, which provides an interface to a processor, and on which software applications run (or execute). Software may be executed by one or more processors within the aerial vehicle 110. A processor also may include, for example, controllers, application specific integrated circuits (ASICs) and/or field programmable gate arrays (FPGAs). The processor may be configured to execute the software in a specific manner. FIG. 7 provides an example machine architecture with a processor that may be configured to execute software. It is noted that not all the components of FIG. 7 may be included in the aerial vehicle 110. FIG. 7 is intended to be illustrative in describing an architecture of a computing system, of which all or parts may operate within the aerial vehicle 110 and the EC system 210.

In this example, the aerial vehicle 110 may be configured to include an aerial vehicle operating system (AVOS). By way of example, the AVOS may be built on an operating system kernel, for example, LINUX, and/or may be based on an operating system such as ANDROID OS. The software components of aerial vehicle described in the disclosure may operate with the AVOS.

In one example embodiment, the flight controller 215 of the EC system 210 may coordinate and process software for the aerial vehicle 110. The flight controller 215 may integrate the AVOS. Examples of processing directed by the flight controller 215 include coordinating communication with the remote controller 120 through the communication subsystem 260 and processing commands to and from the remote controller 120. The flight controller 215 may also control flight related operations of the aerial vehicle 110 by control over the other components such as the ESC 220 and the sensor subsystem 235. The flight controller 215 may also interface with the gimbal controller 230 to assist with controlling the motors of the gimbal 190. In addition, the flight controller 215 may be used to assist with the image link 245 for camera control operations. The flight controller 215 may also interface with the power subsystem 240 to manage and supply power to the components of the EC system 210.

The ESC 220 is configured to interface with the thrust motors electronics 225. The ESC 220 may be configured to control, via the thrust motors electronics 225, the speed applied by thrust motors in the arms 135 to the propellers 140. The ESC 220 may control each thrust motor through the thrust motors electronics 225 individually or in groups or subgroups. It is noted that the thrust motors electronics 225 may be integrated with the thrust motors.

Next, the gimbal controller 230 may include control electronics (and may include firmware) that may be configured to control operation of the motors for each axis of the gimbal 190. The gimbal controller 230 may receive commands via the flight controller 215. The commands may originate from the remote controller 120, which may pass them to the flight controller 215 via the communication subsystem 260.

The image link controller 245 is configured to communicate with the camera interface 250 to transmit commands that may include capture of images from a camera for transmission to the remote controller 120 (and/or other devices with a screen, such as a smart phone or tablet), for example, via the communication subsystem 260. The images may be overlaid and/or augmented with other data from the aerial vehicle 110 such as, for example, sensor data from the sensor subsystem 235. When images are sent to both the remote controller 120 and another device, the overlaid information may be the same on each device or distinct on each device. It is noted that the image link controller 245 may have a processing configuration that allows commands to be directly transmitted between the communication subsystem 260 and the camera interface 250. Alternately, or additionally, the image link controller 245 may communicate with the flight controller 215 for processing resources and application of software configurations.

The camera interface 250 is configured to receive camera control commands from the image link controller 245. The camera control commands may include commands to initialize camera operations, (e.g., frame capture rate, still or video images, and the like). The camera control commands may originate from the remote controller 120 and may be received via the communication subsystem 260 and image link controller 245 of the EC system 210.

The sensor subsystem 235 includes one or more sensors. The one or more sensors may be further grouped as sensor modules to gather particular types of data. For example, one sensor module may be for positional sensors and another sensor module may be for environmental sensors. Positional sensors may provide location and/or relative location in space and orientation information of the aerial vehicle 110. Positional sensors assist with navigation and location related operations of the aerial vehicle 110. Positional sensors may include, for example, gyroscopes, accelerometers, compasses, global positioning system (GPS) sensors, motion sensors, and/or altimeters. Environmental sensors provide information of a particular environment. For example, environmental sensors may provide information on environmental conditions external to the housing 130 of the aerial vehicle 110. Further by example, environmental sensors may provide information on conditions within the housing 130 of the aerial vehicle 110. Environmental sensors may include, for example, temperature sensors, photodetectors, heat sensors, moisture sensors, and/or barometric sensors. It is noted that in some example instances, an environmental sensor may also operate as a positional sensor for purposes of how the data may be used and vice versa. For example, a photodetector may be used to determine time of day for a flight, but also may be used to detect shadows for avoidance detection during flight of the aerial vehicle 110. Similarly by way of example, a barometric sensor may be used to determine atmospheric pressure and aerial vehicle 110 altitude. Note that other sensor configurations also may be included in addition to the examples given.

The sensor data from the sensor subsystem 235 may include sensor metadata and may be integrated with images and/or metadata from a camera. The images from the camera, which may also include additional metadata, may be transmitted wirelessly to other devices and/or stored for later playback. When the images are displayed (e.g., played in real-time or from storage), the sensor data may be extracted from it and provided for display on a screen, for example, the screen 170 of the remote controller 120 or a screen of a computing device (e.g., laptop, smartphone, tablet, and/or desktop computer). The camera interface 250 may interface with a camera or may include an integrated camera.

The power subsystem 240 is configured to manage and supply power to the components of the EC system 210. The power subsystem 240 may include a battery pack and a protection circuit module as well as a power control/battery management system. The battery may be replaceable and/or rechargeable. The battery of the power subsystem 240 may be configured to charge the camera in flight as needed or pre-flight. Other devices also may be charged using the energy capacity of the battery of the power subsystem 240, for example, the remote controller 120, a powered handheld grip, or a mobile phone. The battery may also be used to charge the camera, or other devices, post-flight, depending on energy remaining in the battery. Further, the power subsystem 240 may be configured to include a dual power path. A first path allows for a first power level (e.g., low current) to be used to power up the aerial vehicle 110 and its onboard components. Once components are powered, the aerial vehicle 110 may transition to a second power level (e.g., high current) which is sufficient to consistently drive the thrust motors and onboard components during flight to specified power levels. In addition, a regenerative charging configuration may be integrated into the power subsystem 240. For example, the power subsystem 240 may include a recharge circuit electrically coupled with the thrust motors so that when the thrust motors are decelerating, current is pushed (i.e., reversed) back through the recharge circuit to charge the battery of the power subsystem 240.

The communication subsystem 260 includes communication electronics (and may include corresponding firmware) for the aerial vehicle 110. For example, the communication subsystem 260 may include a long range WiFi system. It may further include additional wireless communication components. For example, it may include another (secondary) WiFi system, which may allow for one WiFi system to be dedicated to direct control communications with the remote controller 120 and the other WiFi system may be used for other communications, such as image transmissions. It may include a communication system such as one based on long term evolution (LTE), 3G, 4G, 5G or other mobile communication standard. The communication subsystem 260 may be configured with a unidirectional remote control channel for communication of controls from the remote controller 120 to the aerial vehicle 110 and a separate unidirectional channel for an image downlink from the aerial vehicle 110 to the remote controller 120 (or to a video receiver where direct image connection may be desired). The communication subsystem 260 may be used to allow for other services, for example, to provide over the air or hardwire link updates, such as firmware updates to the aerial vehicle 110. Some third-party services may be provided access to the communication subsystem 260 or components within via application programming interfaces (API).

Exemplary Adaptive Gain Based on Sensor and Control Input to Achieve Optimal Flight Characteristics In one embodiment the flight controller 215 dynamically adjusts gain values applied to outputs of various subsystems of the aerial vehicle 110 used to control the motors, e.g., thrust motors, of the aerial vehicle. The gain values may be adjusted based on various information, such as control inputs or feedback from various subsystems of the aerial device 110. The control inputs are the initial inputs used to determine how to move the aerial vehicle, and may include the control operations provided by the remote controller 120 via the various control features. The control inputs may also include automated control, such as when using the return to home option as described above. The feedback information may include the current signal indicating the thrust vector to be applied to the aerial vehicle 110, and other feedback information, such as wind speed, motor rotational speed, and so on.

The gain value that is applied by the flight controller 215 may modify the value of the output signal that is sent to the ESC 220. A lowering of the gain value creates a dampening effect where the response of the aerial vehicle to various control inputs is dampened. The output signal sent to the ESC 220 may be a PWM (pulse width modulation) power signal, or a digital signal indicating a certain power level. The ESC 220 in turn may commutate the signal (i.e., convert it into an alternating current signal) or may generate a PWM alternating current signal based on the digital input. The ESC 220 may also modify the PWM signal to simulate a sinusoidal waveform, resulting in quieter operation of the actuator (as a sinusoidal waveform has less harmonics than a traditional trapezoidal waveform). The ESC 220 may further generate additional signals to generate the multiple (e.g., three) phase signal used to power the sets of electromagnets in the actuator.

The flight controller 215 may determine the gain value based on a current mode or a desired mode of the aerial vehicle (as set by a user or by an automated control). Each mode of the aerial vehicle specifies a different set of flight characteristics for the aerial vehicle and is designed for a different usage scenario of the aerial vehicle. The gain value for each mode is configured to allow the aerial vehicle 110 to achieve the specified flight characteristics for the mode. In particular, the aerial vehicle may be used for aerial cinematography. When using the aerial vehicle for filming, the different modes of the aerial vehicle may depending on the different types of filming scenarios that are needed, such as smooth flight characteristics in wide angle landscape shots, or fast movement in chase scenes, stable flight characteristics in windy environments, and fast movement when filming is turned off.

The flight controller 215 may determine which mode the aerial vehicle is in based on information received from the sensor subsystem 235, feedback within the aerial vehicle, or based on external inputs received from the communication subsystem 260, e.g., from user input or from another device, such as a smartphone. For example, the mode may be changed based on an input from the user (e.g., between a slow "mellow" mode and normal mode). As another example, the flight controller 215 may determine that filming has commenced, and that the current weather is windy, and determine that the current mode should be switched to a mode suitable for filming in windy situations (e.g., the flight controller 215 may lower the gain in this mode).

In one embodiment, the adjustment from one gain value to another gain value by the flight controller 215 may be smoothed. This allows for a smooth and not sudden change in the gain values, resulting in a smooth transition between different modes. Furthermore, the flight controller 215 may continuously adjust the gain values until the desired flight characteristics are reached according to information from the sensors.

The gain value determines the rate of change of the output signal to the ESC 220, or may instruct the ESC 220 itself to modify this rate. The rate of change here refers to the rate at which the output signal changes in response to a change in control input. For example, if the control input indicates a change in the forward translational rate (e.g., the thrust), the flight controller 215 may use the gain value to determine the rate at which the output signal should change from the prior value to the new value (bearing in mind that the flight controller 215 also adjusts the new value by the gain value as described above).

Additional modes, how modes are detected, and adjustment of gains based on these modes are described below with reference to FIGS. 3 and 5.

Example Controller Architecture

Figure 3A:
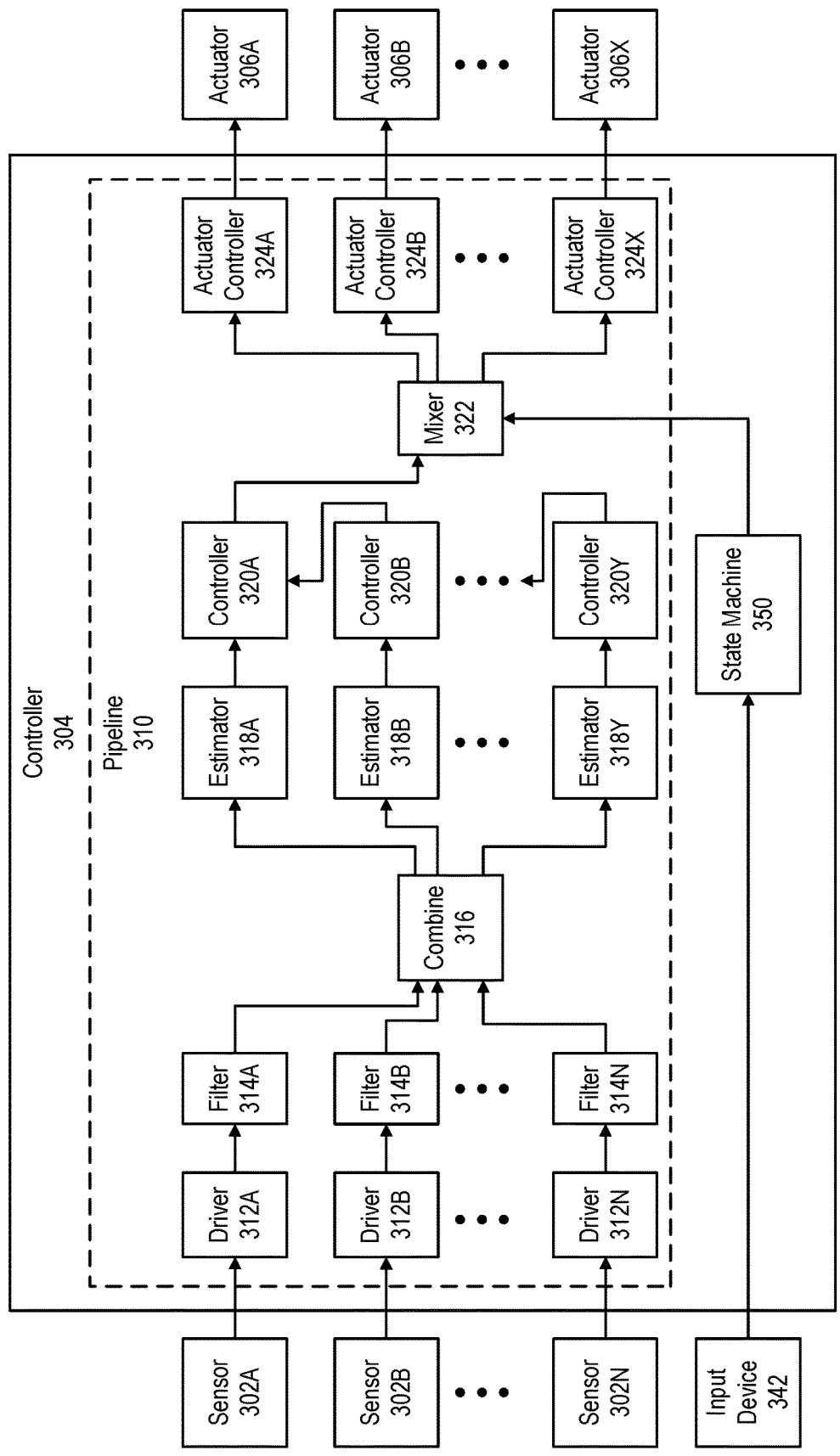
FIG. 3A illustrates an example pipeline flight processing environment including sensors, a controller, and actuators, according to one example embodiment.

FIG. 3A illustrates pipeline flight processing environment 300 (hereinafter referred to as "processing environment 300"), according to one example embodiment. The processing environment 300 may include sensors 302A through 302N (hereinafter collectively referred to as "sensors 302"), a controller 304, and actuators 306A through 306X (hereinafter collectively referred to as "actuators 306"). For example, the sensors 302 may be a part of the sensor subsystem 235, and the controller 304 may be a part of the flight controller 215, and the actuators 306 may correspond with powered components (e.g., thrust motors in the arms 135 coupled to the propellers 140) and may be a part of the thrust motors electronics 225.

The sensors 302 may provide sensor data including location information, orientation information, and/or environmental information. The sensors 302 may include, for example, gyroscopes, accelerometers, compasses, global positioning system (GPS) sensors, motion sensors, altimeters, temperature sensors, photodetectors, heat sensors, moisture sensors, relative wind speed sensor (e.g., an anemometer), and/or barometric sensors.

In some configurations, the sensors 302 may receive a request from the controller 304 for new sensor data. For example, the sensors 302 may receive a request from the controller 304 periodically (e.g., once every microsecond). The sensors 302 may transmit new sensor data to the controller 304 in response to the request. In other configurations, the sensors 302 may interrupt the controller 304 and transmit new sensor data. For example, the sensors 302 may interrupt the controller 304 periodically (e.g., once every microsecond). The sensors 302 interrupting the controller 304 with new sensor data may reduce latency than compared to the sensors 302 transmitting the new sensor data in response to a request from the controller 304.

Additional information regarding the path of signals between the sensor and controller are described below with reference to FIG. 4.

The controller 304 may include a pipeline 310 and a state machine 350. The pipeline 310 may reduce latency and jitter from the controller 304 inputs (e.g., sensors 302) to the controller 304 outputs (e.g., actuators 306). Latency may be, for example, a total processing time from each input to each output and jitter may be, for example, a variation in the total processing time from each input to each output. The pipeline 310 allows for parallel computing in the controller 304. For example, while pipeline 310 is waiting for input (e.g., new sensor data from the sensors 302), the controller 304 may execute other tasks. The pipeline 310 may start based on input from the sensors 302. For example, the pipeline 310 may start based on an interrupt signal from an inertial magnetic unit (IMU) sensor.

The pipeline 310 may include a set of data processing elements (e.g., hardware and/or software modules) connected in series, where an output of one element is coupled to an input of a next element. As illustrated in FIG. 1, the pipeline 310 may include drivers 312A through 312N (hereinafter collectively referred to as "drivers 312"), filters 314A through 314N (hereinafter collectively referred to as "filters 314"), a combine 316, estimators 318A through 318Y (hereinafter collectively referred to as "estimators 318"), controllers 320A through 320Y (hereinafter collectively referred to as "controllers 320"), a mixer 322, actuator controllers 324A through 324X (hereinafter collectively referred to as "actuator controllers 324"). As illustrated, there may be "N" sensors 302, drivers 312, and filters 314, "Y" estimators 318 and controllers 320, and "X" actuator controllers 324. "N" may be greater than "Y" which may be greater than "X."

A scheduler (not shown) may schedule an execution time for each module in the pipeline 310 such that low priority tasks/modules may execute without adversely affecting an execution time of high priority tasks/module. The scheduler may have preemption and priority based scheduling. For example, high priority tasks may have a short execution time and may run frequently whereas low priority tasks may have a longer execution time and may run less frequently. By way of another example, if execution time may be fixed or bounded, the system may be configured to accommodate both ranges of tasks. In this example, high priority tasks may have a very short execution time and need to run very frequently while other lower priority tasks may take longer to run but run less frequently. If the times are fixed or bounded and the scheduler has preemption and priority then both may be scheduled to execute properly. For example, a driver that runs every 1 millisecond (ms) for 3 microseconds can interrupt an algorithm that takes 8 ms to run but only needs to run every 20 ms. There can be sufficient time for both to run; however, the driver must interrupt the algorithm several times during its execution. Both may have some hard real-time deadline but that may be accommodated if execution times may be fixed or bounded. By way of yet another example, some tasks may be timed such that the tasks run each time the controller 304 receives new sensor data from the sensors 302.

The scheduler may use a real-time clock to schedule tasks that have different cadence. Resource patterns such as semaphore and mutex may be used to signal to the scheduler that there are pending tasks/actions. The data processing elements of the pipeline 310 (e.g., the drivers 312, the filters 314, the combine 316, the estimators 318, the controllers, 320, the mixer 322, and the actuator controllers 324) may execute at a constant time. An execution time of each of the data processing elements may be less than the execution time of the pipeline 310. In some configurations, the minimum, maximum, and average execution time of each of the data processing elements may be equivalent. In other configurations, the execution time of each of the data processing elements may be bounded. In other words, the maximum execution time may have an upper threshold. Executing the data processing elements at a constant time may be advantageous as it may reduce latency and jitter, and may increase the operating frequency and efficiency of the pipeline 310 and/or controller 304.

The drivers 312 may request/receive the new sensor data from the sensors 302. In some configurations, the drivers 312 may request for the new sensor data from the sensors 302 and in response may receive the new sensor data from the sensors 302. For example, the drivers 312 may request for the new sensor data periodically. In other configurations, the drivers 312 may be interrupted by the sensors 302 with the new sensor data. For example, the drivers 312 may be interrupted periodically. The drivers 312 may pre-process the new sensor data. Pre-processing the new sensor data may include correcting for sensor translation and rotation relative a center of mass of the aerial vehicle 110, correcting for bias, scaling, applying calibration data, and the like. The drivers 312 may output the pre-processed sensor data.

The filters 314 may filter the pre-processed sensor data received from the drivers 312. Filtering the sensor data may include reducing the sampling rate of (e.g., downsampling) the sensor data. For example, the filters 314 may keep every fourth instance of data of the sensor data and thereby may reduce the sampling rate of the sensor data. Filtering may include decimating, low-pass filtering, high-pass filtering, band-pass filtering and/or other filtering techniques may be used. The filters 314 may filter the sensor data differently on a per-sensor basis based on the sensor 302 that the sensor data originated from. The filters 314 may output the filtered sensor data.

The combine 316 may package the filtered sensor data received from the filters 314 into packaged sensor data. Packaging the filtered sensor data may include combining the filtered sensor data for a period of time. The period of time may be a time corresponding to a cycle of the pipeline 310. The combine 316 may output the packaged sensor data.

The estimators 318 may determine estimates regarding a position of a vehicle (e.g., the aerial vehicle 110) including the sensors 302 based on the packaged sensor data received from the combine 316. Determining the estimate may include determining attitude information, altitude information, heading information, and/or an absolute position relative to the earth. In some configurations, the estimators 318 may determine whether the packaged sensor data includes errors or is otherwise corrupted. If the estimators 318 determine the packaged sensor data does not include errors, the estimators 318 may determine the estimate; otherwise, the estimators 318 may suspend further determinations until new packaged sensor data is received. The estimators 318 may output the estimate regarding the position of the vehicle.

The controllers 320 may generate control signals based on the estimates received from the estimators 318. Further, a higher order controller may generate its control signals further based on control signals of a lower order controller. For example, a first estimator (e.g., estimator 318B) may determine a first estimate and a second estimator (e.g., estimator 318A) may determine a second estimate. The lower order controller (e.g., controller 320B) may generate first control signals based on the first estimate from the first estimator, and the higher order controller (e.g., controller 320A) may generate second control signals based on the second estimate from the second estimator and the first control signals from the lower order controller. Each controller (e.g., controller 320A-320N) may generate different control signals. For example, a position controller may generate control signals for velocity, a velocity controller may generate control signals for an angle, an angle controller may generate control signals for a rate, a rate controller may generate control signals for thrust and may include a thrust vector. The highest order controller (e.g., controller 320A) may transmit its control signals to the mixer 322. The controller 320A may be, for example, a rate controller and may transmit a thrust vector to the mixer 322.

In one embodiment, as described above the controllers 320 may modify the control signal based on the information received from the sensors 302 and depending upon the mode that the aerial vehicle is currently in. The sensor data may be processed as described above in the pipeline 310.

The state machine 350 may transmit to the mixer 322 information regarding the data processing elements currently executing. As illustrated in FIG. 3, the state machine 350 may not be a direct part of the pipeline 310 and may have no effect on the data processing elements of the pipeline 310. Furthermore, the state machine 350 may not be time dependent. The state machine 350 may maintain a state of the pipeline 310 and may move the pipeline 310 through various operational states, such as, for example, initialization, ready for take-off, take-off, flight, sensor error, ready for landing, landing, landed, and the like).

The state machine 350 may receive input from an input device 342. The input device 342 may be, for example, the aerial vehicle 110 and/or the remote controller 120. In some configurations, the input device 342 may be one or more of the sensors 302 and may transmit sensor data such as, for example, IMU sensor data, global positioning system (GPS) sensor data, and the like. In other configurations, the input device 342 may be one or more modules of the pipeline 310 (e.g., the drivers 312, the filters 314, the combine 316, the estimators 318, and/or the controller 320). In these configurations, the state machine 350 may operate on preset assumptions that tasks may run for fixed times periodically at a rate the drivers 312 receive new sensor data from the sensors 302. If tasks do not run or if tasks do not complete in a fixed or bounded time, the state machine 350 may flag an error.

The state machine 350 may further move the pipeline 310 into a specific operational state (e.g., an error state). For example, an estimator of the estimators 318 may run for 100 microseconds (μs) every 4 milliseconds (ms) when gyroscope data from a gyroscope sensor of the sensors 302 is expected. Responsive to the state machine 350 detecting that in 8 ms the estimator has not run or that the estimator has run for greater than 100 μs in any 4 ms window, the state machine may flag an error. The guarantee of real-time systems (e.g., the pipeline flight processing environment 300) may be based on both proper operation and design calculations and assumptions that must remain true during operation.

The state machine 350 may receive input from the input device 342 and may transmit one or more signals to (i.e., "signal") one or more modules of the pipeline 310 connected to the output of the state machine 350. In one example, the state machine 350 may transmit a signal to "arm" the module of the pipeline 310 connected to the output of the state machine 350. As illustrated in FIG. 3, the state machine 350 may transmit a signal to the mixer 322 to arm the mixer 322. In another example, the state machine 350 may change a state, may transmit a signal to one or more of the drivers 312 to change an operating mode (e.g., from a first operating mode to a second operating mode), and may transmit a signal to one or more of the controllers 320 to change to a specific operating mode. The state machine 350 may provide non-time related information to the mixer 322. For example, the state machine 350 may identify a current hardware configuration and, responsive to the identification, may transmit the one or more signals to the mixer 322. For example, when the aerial vehicle 110 and/or the remote controller 120 are/is turned on (e.g., booted up), the state machine 350 may receive an input signal from the input device 342, and may transmit one or more signals to the mixer 322 to modify commands for driving the actuators 306 to an initial position (e.g., take-off position). In some configurations, the state machine 350 may track a maximum execution time and an actual execution time of each of the data processing elements, and may transmit an error signal when the actual execution time exceeds the maximum execution time. In one embodiment, the state machine 350 uses the input from the input device 342 to modify the control signals to the mixer 322 and depending upon the mode of the aerial vehicle as described above.

The mixer 322 modifies the control signals based on physical limitations of the actuators 306 and/or the vehicle including the actuators 306. The mixer 322 may synchronously trigger each of the actuator controllers 324. The mixer 322 may output the modified control signals during each cycle of the pipeline 310. In some configurations, the mixer 322 may output the modified control signals as soon as the control signals are modified. For example, in an aerial vehicle with four actuators controlling four rotors, a particular motion of the system may require a certain amount of output power to be directed to each actuator, depending upon factors such as the dimensions of the aerial vehicle, its center of gravity, mass, and so on. For example, a forward movement may require additional power to be routed to two "rear" actuators relative to the power routed to two "forward" actuators, in accordance with the physical characteristics of the vehicle. In such a case, the mixer 322 would adjust the control signal accordingly such that the appropriate power would be routed to the correct actuators.

In some instances where not every movement can be preserved according to the control inputs, e.g., due to strong external forces such as wind, the mixer 322 may rank and prioritize certain control inputs over others. For example, translational movements may be ranked low, with roll, pitch, and yaw ranked higher. Thus, the mixer 322 will deliver power to the actuators with the goal of preserving yaw, then with preserving pitch, roll, and finally thrust, or translational movements.

The actuator controllers 324 may generate actuator control signals based on the modified control signals. The actuator controllers 324 may be, for example, motor controller drivers for various motors. Each of the actuator controllers 324 may output an actuator control signal during each cycle of the pipeline 310 at a same instance in time. In some configurations, each actuator control signal may be, for example, a three-phase sinusoidal pulse width modulation (PWM) signal for driving a current of an actuator (e.g., one of the actuators 306). In other configurations, each actuator control signal may be, for example, a trapezoidal PWM signal for driving a voltage of an actuator (e.g., one of the actuators 306).

As noted above, the use of the sinusoidal signal has the advantage over the trapezoidal signal of providing a smoother power delivery to each actuator 306. As the trapezoidal signal changes between states (e.g., on and off for the component electromagnetic coils in the actuator 306) more abruptly, it may cause an increase in noise in the actuators 306. A sinusoidal signal would instead gradually change states, allowing for smoother and quieter operation. Such quiet operation may allow the aerial vehicle to fit within noise flight characteristics for various cinematography operations. Furthermore, the use of the sinusoidal signal allows for increased power efficiency as well. Note that the sinusoidal waveform may be achieved using PWM by varying the duration of the pulses delivered to the actuators 306 to approximate a sinusoidal waveform.

In one embodiment, the actuator controllers 324 receive as input a speed command and a phase current. The actuator controllers 324 each include an outer proportional-integral (PI) controller for torque control, and an inner PI controller for speed control. The output of each of the actuator controllers 324 is the PWM signal described above.

The actuators 306 may be components responsible for moving or controlling the aerial vehicle 110. In one embodiment, the actuators 306 are brushless DC (direct current) motors. In one embodiment, the actuators 306 support regenerative braking, wherein the actuators 306 may be slowed down in terms of rotational speed by capturing rotational energy from the rotors that are coupled to the actuators 306 and directing the energy back to the battery or other energy storage of the aerial vehicle 110. This allows for an improved response speed from the rotors rather than simply having power reduced to the actuators 306.

Example Adaptive Gain Architecture

Figure 3B:
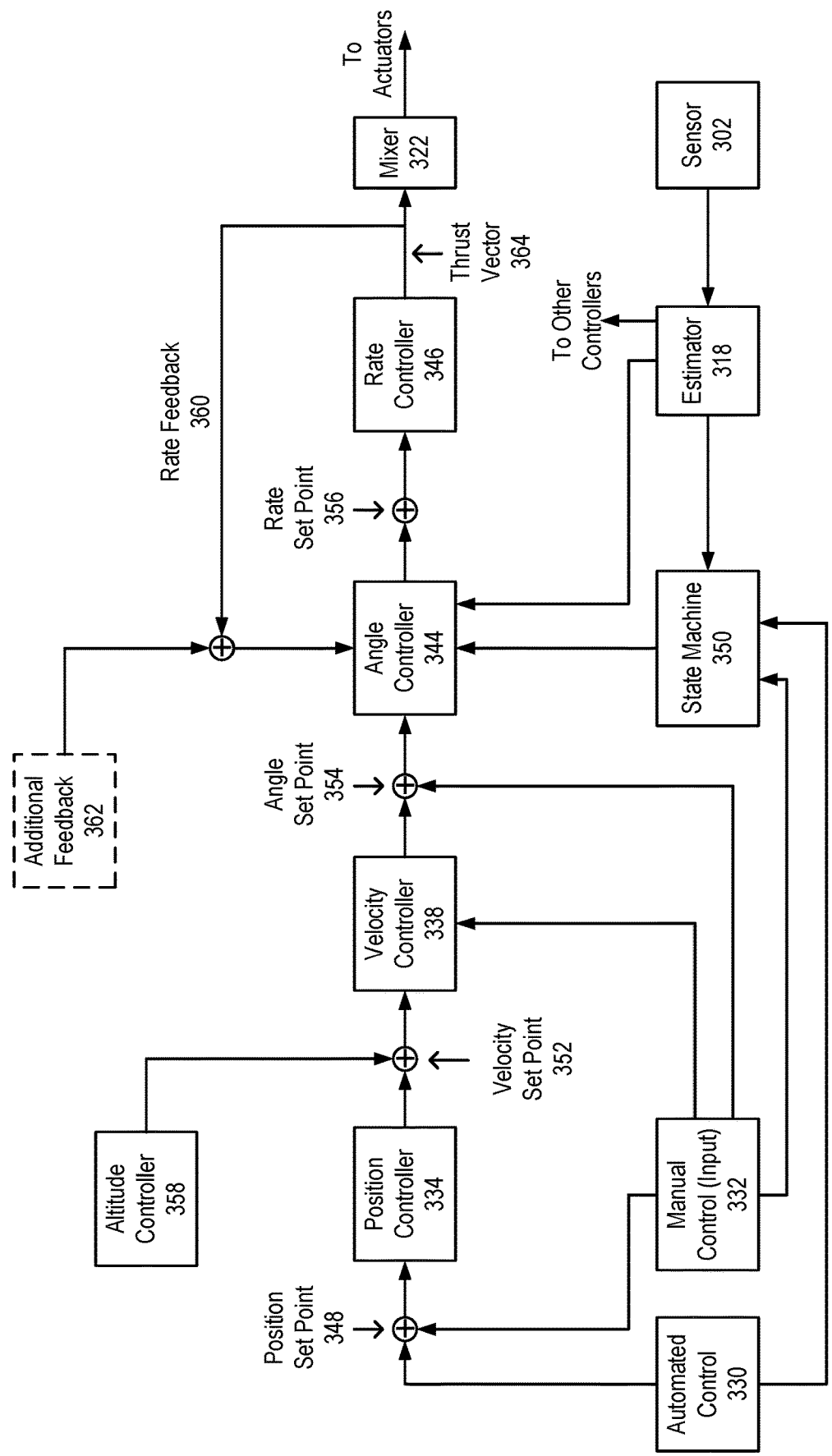
FIG. 3B illustrates a detail view of the pipeline including adaptive gain control, according to one example embodiment.

FIG. 3B illustrates a detail view of the pipeline including adaptive gain control, according to one example embodiment. The detail view shows an automated control 330, a manual control 332, a position controller 334, an altitude controller 358, a velocity controller 338, an angle controller 344, a rate controller 346, a mixer 322, a state machine 350, an estimator 318, and a sensor 302. In one embodiment, the input from either the automated control 330 or the manual control 332 is passed through this pipeline, where various inputs (e.g., a manual input) are converted into outputs (e.g., velocity set point values) that serve as subsequent inputs to further controllers in the pipeline (e.g., the velocity controller), which ultimately lead to the output of a modified thrust value that is output to the actuators of the aerial vehicle. These controllers may be any of the controllers 320, described previously with reference to FIG. 3A. The individual controllers described below, along with other components and functions of the flight processing pipeline of the aerial vehicle 110, may be grouped or combined into a single controller, such as the controller 304 described with reference to FIG. 3A.

The automated control 330 may represent control input from non-user (i.e., non-human) sources, such control input generated from automated maneuvers such as orbit, take-off, etc. This input may be based on a preset path marked with geographical coordinates and followed by the aerial vehicle 110 with the assistance of a global positioning system (GPS) sensor. This input may further be based on corrections to the position made in accordance to changes detected by the sensors 302, such as a gyroscope (e.g., for maintaining stable flight in turbulent conditions). The automated control 330 may be transmitted to the position controller 334 as a position set point 348. The position set point 348 indicates a position in space that may be specified in any coordinate system with any application reference frame. For example, the position set point 348 may be a set of Euclidian coordinates with reference to the start point or take-off point of the aerial vehicle as the zero coordinates. Each coordinate (e.g., each axis x, y, and z) may be separately input into three different position controllers 334, with each position controller 334 managing a single coordinate value (e.g., x, y, or z). Thus, for example, the path indicated in the automatic control 330 may be indicated by 3D position coordinates, and these position coordinates may be set as the position set point 348.

The manual control 332 may represent control input provided by a user (i.e., a human) via an interface device, such as a remote controller (e.g., remote controller 120), or any other device, such as a smartphone, etc. The manual control input may include thrust, yaw, pitch, roll, and other commands as described above. In one embodiment, the pipeline is determining a position, and the manual control input 332 is interpreted as a velocity feed forward into the velocity controller 338. Thus, as noted, the manual control input 332 is fed into the velocity controller 338. In one embodiment, the pipeline is determining an altitude, and the manual control input 332 is interpreted as z velocity (i.e., rate of change in altitude) for setting a z-axis position and for setting x and y axis angle set points. Thus, as illustrated, the manual control input 332 is used to set the position set point 348 and the angle set point 354. In one embodiment, the manual control 332 is converted into positional data and sent as the position set point 348 to the position controller 334. For example, an amount of user input is converted into a rate of positional change which is in turn converted into a positional data (e.g., via numerical integration).

The position controller 334 may receive the position set point 348 from the automated control 330 or the manual control 332 and outputs a velocity set point 352. This sensor data may be received from the estimator(s) 318 or from the sensor(s) 302. The velocity set point 352 indicates a velocity value, e.g., rate of change of position, for the aerial vehicle 110. The velocity set point 352 is set to a velocity value that allows the aerial vehicle to approach the position set in the position set point 348. Note that the position set point 348 and velocity set point 352 may include multiple components (e.g., an x, y, and z component) and thus multiple position controllers 334 may be used to process each component separately.

The position controller 334 may comprise a closed loop control portion and/or an open loop control portion. In the open loop control portion, the position controller 334 receives a position feed forward from the manual control 332 or the automated control 330. This position feed forward may indicate a position at which the aerial vehicle 110 is to be at. The position controller 334 computes a velocity value that allows the aerial vehicle 110 to move towards the position indicated in the position feed forward. Note that the illustrated controllers, for each time interval, may re-compute a new set point value based on a newly received set point value. Thus, the position controller 334 may compute multiple different velocity values over time. For example, as the aerial vehicle 110 approaches the known position set point 348 location, the position controller 334 may reduce the velocity value and set it to zero once the known position set point 348 is reached.

In the closed loop control portion, the position controller 334 may receive the position set point 348 and computes an error value between the position set point 348 and the current position (as indicated by the sensors 302 and/or estimators 318 as described above). The position controller 334 determines a velocity value output based on the error, such that the error value is to be reduced. In one embodiment, the closed loop system is a PID (Proportional Integral Derivative) controller.

The position controller 334 may generate the velocity set point 352 from the velocity value outputs of the closed loop control portion or the open loop control portion, or by summing or otherwise mathematically combining the velocity value outputs from the closed loop control portion and the open loop control portion.

The open loop control portion, unlike the closed loop control portion, may be able to more quickly arrive at a velocity value that can quickly reach the position set point 348 using the feed forward data. In contrast, the closed loop control portion performs to minimize the error value based on a feedback indicating the current position, and thus may respond more slowly compared to the open loop control portion, but may also be more accurate as it receives feedback information. The combination of these two portions provides the advantages of both (i.e., faster response and lower error).

The altitude controller 358 may modify the velocity set point 352 in cases where the sensor data regarding position, e.g., GPS and magnetometer, are not valid (e.g., one or more position sensors indicate an error mode, which may occur due to hardware failure, failure to acquire signal, etc.). The altitude controller 358 receives as input sensor data, such as any available position data from the estimators 318, and may also receive the control input from the automatic control 330 or the manual control 332. The altitude controller 358 may also receive the position set point 348, or receive the position set point 348 for only the z axis (e.g., altitude). The altitude controller 358 computes a z (altitude) velocity value as output. In one embodiment, the altitude controller 358 is a PID controller.

The velocity controller 338 may receive a velocity set point 352 and outputs an angle set point 354. The angle set point 354 indicates the angle at which the aerial vehicle 110 should be set based on the velocity set point 352. The angle set point 354 may be set such that the angle indicated in the angle set point 354 is to cause the aerial vehicle 110 to reach the velocity indicated in the velocity set point 352. Note that the velocity set point 352 may include multiple components (e.g., an x, y, and z component) and thus multiple velocity controllers 338 may be used to process each component. The outputs of each velocity controller 338 may be combined to generate the angle set point 354.

The velocity controller 338 may also, like the position controller 334, be comprised of an open loop controller portion and/or a closed loop controller portion. In the open loop controller portion, the velocity controller 338 receives a velocity feed forward value, which may be from the manual control 332, or from another source, such as the position controller 334. Using the velocity feed forward value, the velocity controller 338 determines an angle value directly, without feedback information. The angle value is set such that the velocity value in the velocity set point 352 is reached within a threshold time and according to required flight characteristics. This is similar to the open loop control portion of the position controller 334.

The velocity controller 338 may include a closed loop control portion, similar to the closed loop control portion of the position controller 334, where the velocity controller 338 measures the error between the velocity set point 352 and the current velocity, and outputs an angle value that reduces the error value, according to the parameters of the closed loop control portion. In one embodiment, the closed loop control portion is a PID controller. The angle value outputs from the closed loop and open loop control portions may be summed together to generate the angle set point 354. The angle set point 354 may be based on the angle value output from the closed loop or open loop control portions only.

The angle controller 344 may receive as input the angle set point 354, the current angle of the aerial vehicle 110, a rate feedback 360, and optional additional feedback 362 in order to generate a rate set point 356 with adaptive gain. The rate set point 356 indicates a rate of change of the angle of the aerial vehicle. In one embodiment, multiple angle controllers 344 may be used, each processing a separate component of the angle set point 354 (e.g., yaw, pitch and roll). The outputs of each angle controller 344 may be combined to determine the rate set point 356.

The angle controller 344 may operate as a closed loop control system but receives additional feedback that may be used to modify the gain values for the angle controller 344. For example, this additional feedback may include, but is not limited to: 1) feedback from the rate controller 346 regarding the thrust vector 364 sent to the mixer 322 (i.e., the rate feedback 360), as well as other additional feedback 362, such as: 2) the state of the camera (e.g., frame rate, exposure time, pixel clock, recording mode), 3) gimbal (gyroscope) information (e.g., vibration on gimbal, movement data, estimation of current state or status), and/or 4) feedback from the sensors and estimators of the aerial device, such as wind speed detection, temperature, battery life, time of day, weather predictions, barometric pressure, presence of rain/snow, altitude, motor status (e.g., rotational velocity, heat level, power level, error state), and so on. Note that the feedback from the rate controller 346 is based on the output from the angle controller 344, which in turn is based on the output from the velocity controller 338, the position controller 334, and the automated control 330 and manual control 332.

In one embodiment, the angle controller 344 may determine a mode of the aerial vehicle 110 based on the rate feedback 360 and additional feedback 362, and determines the appropriate gain value(s) based on the mode such that the aerial vehicle is able to achieve the flight characteristics specified by the mode.

In one embodiment, the closed loop control system of the angle controller 344 is a PID controller. The PID controller of the angle controller 244 receives as a reference point the angle set point 354, and computes an error between the angle set point 354 and the current angle value of the aerial vehicle 110 as indicated by the sensor(s) 302 or the estimator(s) 318. The error amount is used in the proportional, integral, and derivative terms of the PID controller to output a rate set point 356. Each term of the PID controller has a gain value ($K_P$, $K_I$, and $K_D$). In response to changes in the feedback information, the angle controller 344 may modify one or more of the gain values of the proportional, integral, and derivative gain terms of the PID controller. The modification may be to reduce the gain value, to increase the gain value, to change the gain value over time, and so on.

In one embodiment, the gain values of the proportional and integral terms of the PID controller may be modified in response to changes to the rate feedback 360. In particular, a change in the value of the rate feedback 360 results in a change of the gain values of the proportional and integral terms of the PID controller. For example, an increase in the rate feedback 360 may result in a decrease of the gain values. The relationship between the rate feedback 360 and the backing off amount may be linear, with a minimum and a maximum backing off amount. The backing off amount for the gains for the proportional term and derivative terms may be different. The change in the gain values may only be triggered after the rate feedback 360 exceeds a threshold amount.

Additional details regarding the adaptive gain method are described with reference to FIGS. 3C-D and FIG. 4.

The rate controller 346 may receive the rate set point 356 as input and outputs a thrust vector 364. The rate controller 346 also transmits the rate feedback 360 to the angle controller 344. The rate feedback 360 indicates the status of the rate controller 346, and may include the thrust vector 364.

In one embodiment, the rate controller 346 may be a closed loop control system, such as a PID controller. The reference value for the rate controller 346 is the rate set point 356, and the error value is the difference between the rate set point 356 and the current rate of change of movement of the aerial vehicle. The output of the rate controller 346 is a thrust vector 364. The thrust vector 364 indicates a direction and magnitude of thrust for the aerial vehicle 110. The thrust vector 364 is sent by the rate controller 346 to the mixer 322, which computes the settings for the actuators in order for the aerial vehicle 110 to achieve the indicated thrust vector 364.

In one embodiment, the state machine determines the mode for the aerial vehicle 110. As described above, the mode specifies flight characteristics for the aerial vehicle 110. The state machine 350 receives sensor and/or estimator input from the estimator(s) 318 and sensor(s) 302. Using this information, the state machine 250 determines a mode for the aerial vehicle, and transmits this mode information to one or more other elements in the pipeline, such as the angle controller 344.

Note that the above process may repeat according to a clock speed, with new inputs and outputs computed repeatedly. Each input and output set point in this case is based on a measurement or control input for a small period of time (dt or Δt).

Example Angle Controller

Figure 3C:
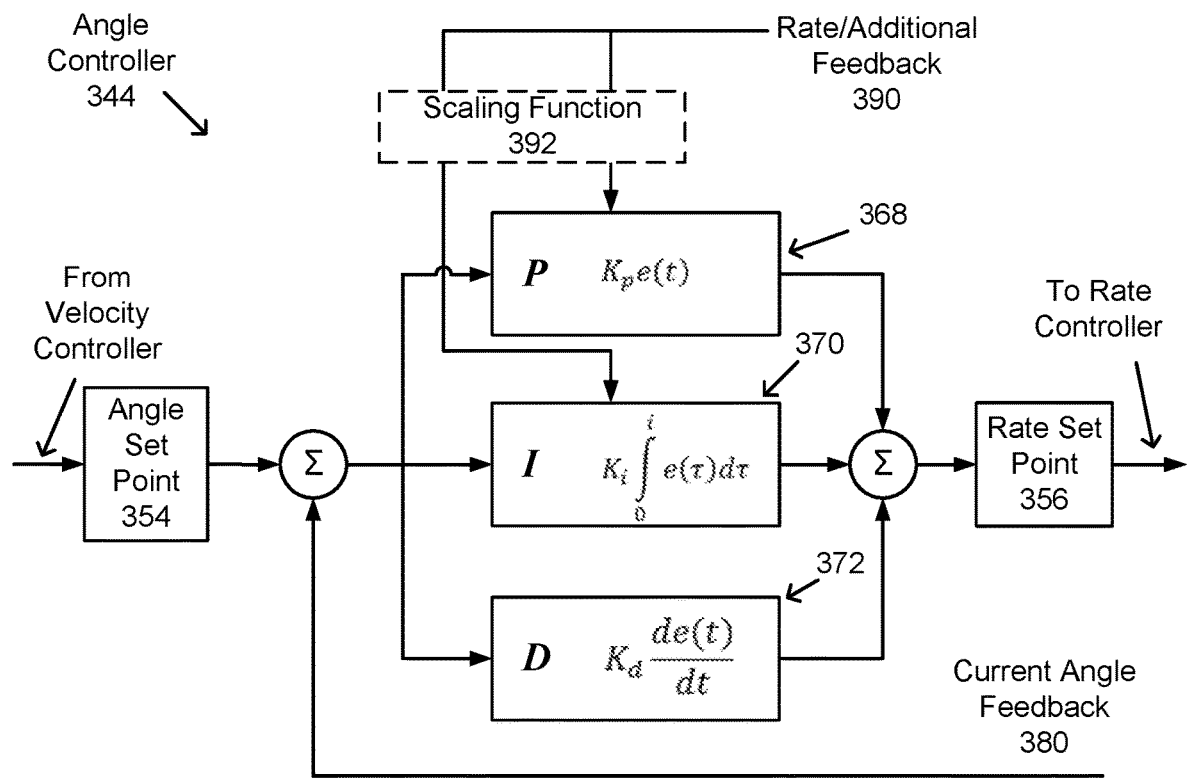
FIG. 3C illustrates in detail an example of the angle controller of FIG. 3B, according to one embodiment.

FIG. 3C illustrates in detail an example of the angle controller 344 of FIG. 3B, according to one example embodiment. As noted above, in one embodiment, the angle controller 344 is a PID controller. The PID controller includes a proportional component 368, an integral component 370, and a derivative component 372. The angle set point 354 received from the velocity controller 338 is the reference value (expected output) for the PID controller. The PID controller also receives the current angle value (the actual output) as indicated in the current angle feedback 380. This current angle feedback 380 may be received from the sensors 302 directly or from the estimator(s) 318. The output of the PID controller of the angle controller 344 is the rate set point 356. The PID controller computes the output based on the difference between the expected output and the actual output, i.e., the error. For example, as the error increases, the output value, i.e., the rate set point 356, also increases.

In particular, the equation for the PID controller is:

$$\text{Output} = (K_P E_P) + (K_I E_I \Delta t) + (K_D E_D / \Delta t) \quad (1)$$

Here, the output may be the rate set point 356. The first term in parentheses is the proportional component 368, the second term in parentheses is the integral component 370, and the third term in parentheses is the derivative component 372. Note that the format of the components here is written in a numerical format for use in a real time system, rather than the analytical format presented in the figure.

In (1), Δt, or dt, is the change in time, i.e., the amount of time elapsed since the previous computation of the output value. This may be dependent upon the clock cycle of the system, such that the change in time is equal to the duration of a clock cycle. $E_P$ is the proportional error and is equal to $ANGLE_{EXPECTED} - ANGLE_{ACTUAL}$, or the difference between the actual angle of the aerial vehicle and the expected or reference angle value in the angle set point 354. $E_I$ is the integral error and is equal to $E_P - E_{I\_LAST}$, where $E_{I\_LAST}$ is the previous $E_I$ from the previous computation of the output (i.e., the previous clock cycle). $E_D$ is the derivative error, which is equal to $E_P - E_{P\_LAST}$, where $E_{P\_LAST}$ is the previous $E_P$ from the previous computation of the output. Both $E_D$ and $E_I$ may be initially set to a default value, such as zero.

In the PID equation (1), the output value may be based on the error values. As the error values become smaller, the output, i.e., the rate, also becomes smaller, and the movement in the aerial vehicle 110 becomes smaller as well. If the error values become negative, the output may also become negative, which may indicate a change in direction for the aerial vehicle 110. This might occur when the aerial vehicle is to slow down.

$K_P$ is the proportional gain value, $K_I$ is the integral gain value, and $K_D$ is the derivative gain value. These gain values are used to adjust each respective term in the PID equation. In one embodiment, these gain values are preset and fixed values, and may be determined based on various desired characteristics, such as a desired rate of reduction for the error value, to minimize oscillations in the output, to achieve a smooth change (i.e., to minimize jerk) in the output as the error is reduced (e.g., the output is limited to a certain rate).

In one embodiment, the gain values are preset, but multiple gain values are used and the angle controller 344 selects the appropriate gain values based on the determined mode. As described above, the mode is determined based on the inputs to the aerial vehicle 110 and determines flight characteristics of the aerial vehicle 110. The angle controller 344 may determine the mode, or the mode may be determined by and received from the state machine 350.

However, in another embodiment, the gain values are modified during operation of the aerial vehicle based on the rate/additional feedback 390 and the selected mode. The rate/additional feedback 390 may include the rate feedback 360 and/or the additional feedback 362. All or some of the gain values may be scaled by the angle controller 344.

The gain value(s) may be scaled according to a scaling function 392, which converts the input rate/additional feedback 390 from the raw input values to a value used to modify or replace the gain values of the PID controller. For example, the scaling function may be a function $F(x') = F(x-1) + g(x)$, where $g(x)$ is a function based on the rate/additional feedback 390. In other words, the scaling function 392 is a combination of the rate/additional feedback 390 and the previous scaling function 392 output. Different minimum, maximum, and initial values for the scaling function 392 may be set based on the determined mode of the aerial vehicle 110. The scaling function 392 itself may vary based on the mode that is in effect. For example, different coefficients may be applied to the terms of the scaling function 392 based on the current mode. As another example, the scaling function 392 may not be linear but instead by a polynomial or exponential function for certain modes. This may be used when the gain values are to change more significantly as the feedback values increase. The output from the scaling function is used to modify the gain values (the proportional, integral, and derivative gains), e.g., by scaling the gain values by the scaling function. Each gain value to be affected may use a different scaling function. Note that the gain values and/or scaling functions to use may be determined experimentally, or for example, based on root locus analysis based on a modeling of the system using a transfer function.

By scaling the gain values, the system is able to vary the rate set point 356 dynamically not just in accordance with the error in the angle value, but in accordance with additional desired flight characteristics for different modes of operation. Unlike a system with fixed gains, the varying of the gain values allows the aerial vehicle 110 to provide a more desired or optimal operation customized towards to the current flight mode, camera mode, or other operation.

Example Angle Controller Response Curves

Figure 3D:
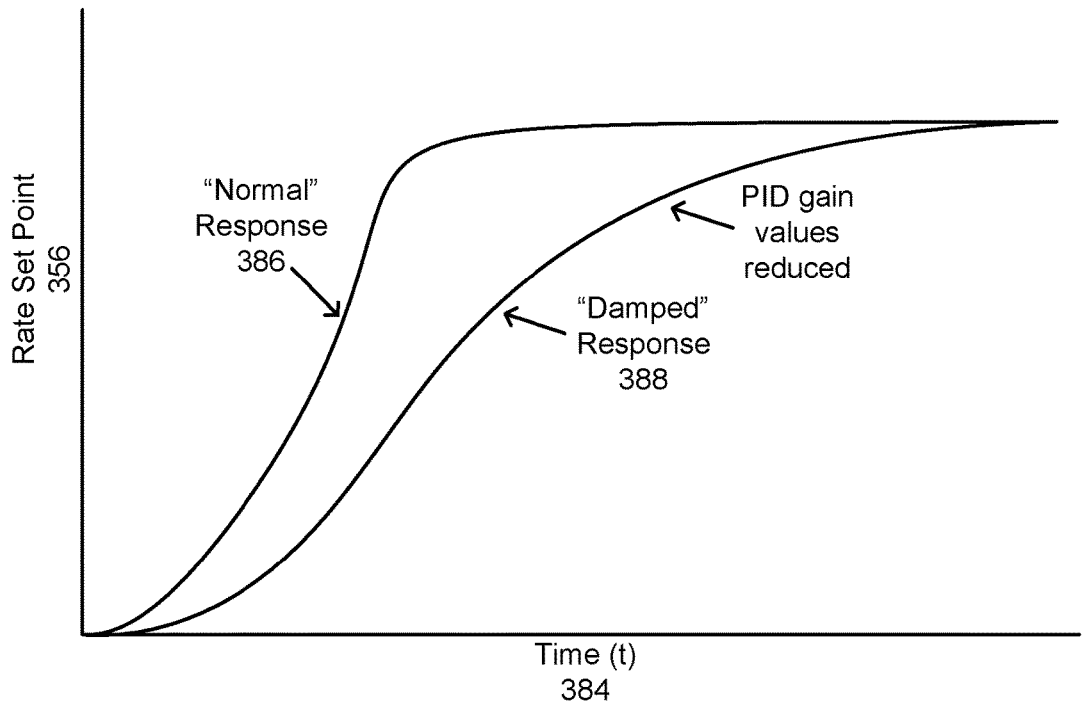
FIG. 3D illustrates an example response for the rate set point for the angle controller in a normal state and a damped state, according to one embodiment

FIG. 3D illustrates an example response for the rate set point 356 for the angle controller 344 in a normal state and a damped state, according to one example embodiment. The chart in FIG. 3D plots the rate set point 356 over time 384. The chart assumes that in the two response curves, the values for the angle set point 354 and the current angle value are the same for both curves over time. Thus, the only difference between the two curves are the gain values that are applied. In the normal response curve 386, the rate set point 356 may increase quickly to reach a desired value in which the error of the angle value is minimized (e.g., reaches zero). However, in other circumstances, such as when using a cinematic mode, the angle controller 344 uses different gain values, or applies a scaling function to the gain values, such that a damped response curve 388 is created, in where the rate set point 356 reaches the same value as in the normal response curve 386. Depending upon the mode, additional response curves different from those illustrated may be generated based on the change of the gain values of the PID controller for the angle controller 344. Additional modes are described below with reference to FIG. 4.

Exemplary Modes and Gains

Figure 4:
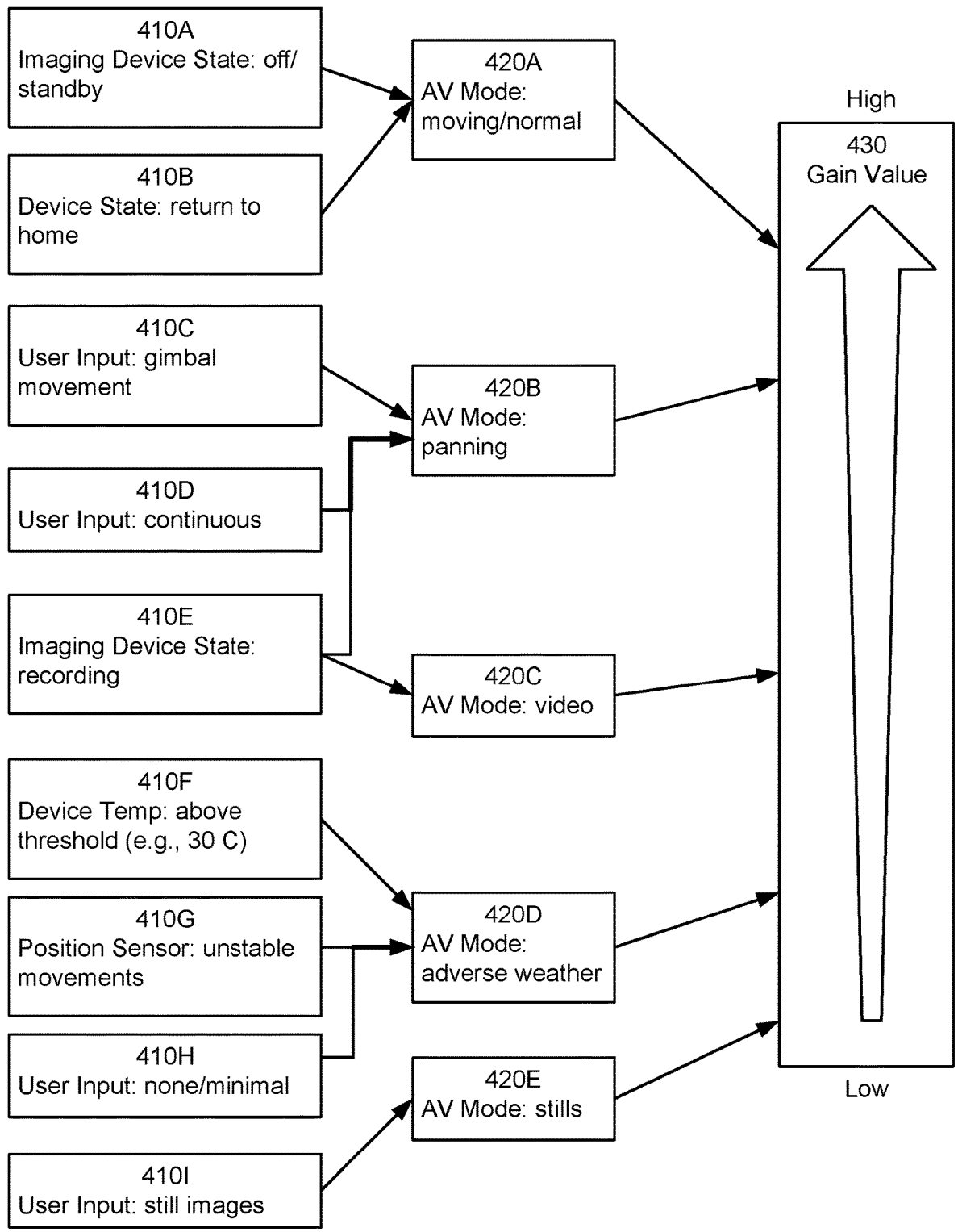
FIG. 4 illustrates a set of exemplary flight modes for an aerial vehicle and the corresponding gain values associated with these flight modes, according to one example embodiment.

FIG. 4 illustrates a set of exemplary flight modes for an aerial vehicle and the corresponding gain values associated with these flight modes, according to one example embodiment.

Various exemplary (sensor and/or control) inputs 410A-I, modes 420A-E, and gain values are illustrated in FIG. 4, although these inputs 410, modes 420, and are for illustrative purposes only and the aerial vehicle may include more, less, or different inputs, modes, and gain values. The arrows in FIG. 4 indicate the mode 420 that each input 410 indicates, and the gain value 430 that each mode corresponds to.

Depending upon the inputs 410, the controller 304 determines that the aerial vehicle is in a specific mode 420. Depending upon the mode 420, the controller 304 determines a gain value(s) 430 for the selected mode 420, such that when the gain value is applied, the aerial vehicle conforms to a set of flight characteristics indicated for the mode. For example, if the controller 304 determines that the current status of the imaging device attached to the aerial device is an off or standby state 410A, then the controller 304 may set the aerial vehicle (AV) in a moving or normal mode 420A. In this mode, the gain value 430 is set relatively high, e.g., to a maximum gain value that still allows for or conforms to a set of stable flight characteristics (e.g., speed, rates of yaw, pitch, and roll within threshold values that allow the aerial vehicle to remain in controlled flight), or a scaling function is used that scales the gain value(s) to a maximum value that still allows for stable flight, with a minimum value that ensures a minimum preset performance (e.g., minimum speed, response time, turn rate). These stable flight characteristics may be indicated (and associated) with the normal/moving mode.

Some modes may be triggered by the controller 304 only upon two or more inputs matching a criterion or exceeding a threshold. For example, if the position sensor of the aerial vehicle indicates unstable movements 410G (e.g., acceleration beyond a certain threshold, or motion jitter beyond a certain threshold), and the current user input is none (no input made) or minimal 410H, the controller 304 may determine that the current mode should be set to adverse weather 420D. The adverse weather mode 420D specifies a set of conservative flight characteristics, and thus corresponding gain value(s) 430 for this mode is low, in order to increase the stability of movements in the aerial vehicle, whether from user input or from other components. Alternatively, the scaling function used for such a mode may be configured such that an increased feedback from sensors indicating high wind speed further scales down the gain value(s). As the adverse weather has a strong effect on the motion of the aerial vehicle, any additional control inputs should be reduced by lowering the gain value(s) in order to dampen the effects of the additional control inputs to reduce undesirable visual elements during recording, or to avoid any instability with the aerial vehicle. The combination of more than one input is indicated by the bold line combining the lines from 410G and 410H in FIG. 4. Note that the adverse weather mode 420D may be triggered by other inputs as well, such as a temperature sensor indicating an above threshold temperature 410F.

The determination of the flight characteristics and gain values which should apply for each mode may be determined based on user feedback. The aerial vehicle may be tested with different users and/or experts in situations that trigger particular modes, and different flight characteristics may be set for the aerial vehicle with associated gain values. Those flight characteristics and gain values that produce the largest number of positive feedback responses regarding image quality may be selected for that particular mode.

Additional modes are described in FIG. 4. For example, the aerial vehicle may also have a still image mode 420E, a panning mode 420B, and a video mode 420C. The panning mode may be used for cinematography requiring significant movement of the camera, e.g., during a panning scene or chase scene. Thus, the gain value for such a mode may be higher than the video mode, but lower than the normal mode. The panning mode 420B may be initiated when the controller 304 detects that there is a continuous user input 410C (e.g., in one direction), and that the state of the imaging device is recording 410E (e.g., the imaging device is recording a video).

Additional modes may depend upon sensing other settings for the camera. For example, a high zoom level may indicate that a telephoto image or video is to be taken, and thus the gain values may be lowered to compensate. The scaling function may in this case be based upon the amount of zoom. Another mode may be based on the frame rate setting of the camera on the aerial vehicle 110. For example, a high frame rate setting may indicate a slow motion recording mode, and so the gain values may also be lowered to reduce jitter during recording. In such a case, the scaling function may be based on the frame rate.

Example Sensor, Controller, and Actuator Interactions

Figure 5A:
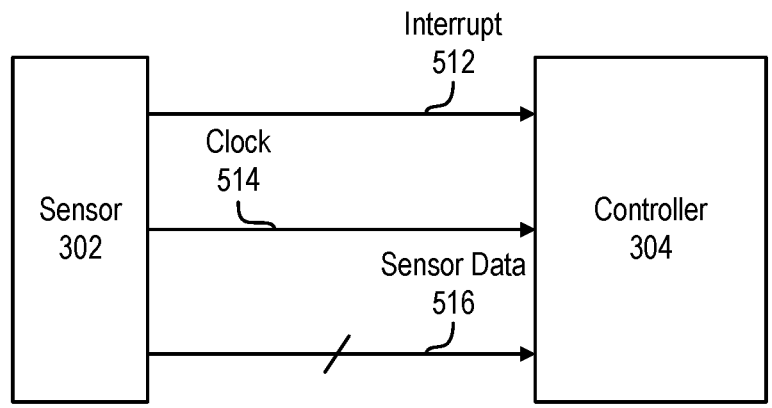
FIG. 5A illustrates an example interaction between a controller and an actuator, according to one example embodiment.

FIG. 5A illustrates an interaction between the sensor 302 and a controller 304, according to one example embodiment. The sensor 302 may transmit an interrupt signal 512, a clock signal 514, and sensor data 516 to the controller 304. The interrupt signal 512 may indicate an event at the sensor 302 needs immediate attention by the controller 304 (e.g., that the sensor 304 has new sensor data available). The event at the sensor 302 may be of varying priority, for example, low priority, medium priority, high priority, and/or urgent priority. The clock signal 514 may be used to synchronize the operation of the sensor 302 and the controller 304. The sensor data 516 may include location information, orientation information, and/or environmental information.

Figure 5B:
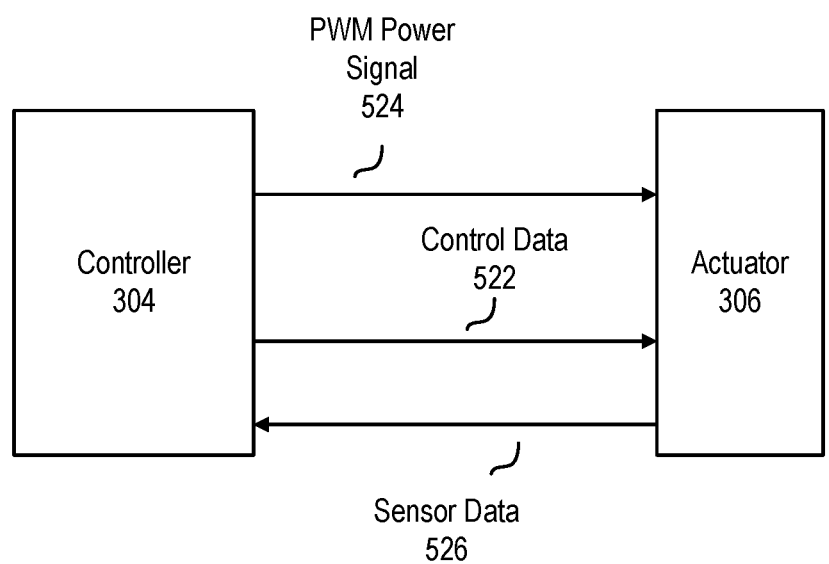
FIG. 5B illustrates an interaction between the controller 304 and an actuator 306, according to one example embodiment.

FIG. 5B illustrates an interaction between the controller 304 and an actuator 306, according to one example embodiment. While a single actuator 306 is shown here, note that the aerial vehicle may have multiple actuators, with the controller 304 providing a power signal to each.

Depending upon the control inputs, sensors, and gain values, the controller 304 outputs a particular PWM power signal 524 to the actuator 306. The amplitude (e.g., power) of the PWM power signal 524 may be vary proportionally from the input control signals (e.g., from the remote controller) based on the gain value computed at any particular moment. The PWM power signal 524 may include multiple phases to drive multiple sets of electromagnets within the actuator 306. The frequency of the PWM power signal 524 may depend upon the power provided to the electromagnets. A higher power value (e.g., from increasing the duration of the PWM pulses) results in larger changes in the waveform signal that is sent to the actuator 306 and may result in a faster rotational speed in the actuator 306. Thus, the controller 304 must compensate for this change in speed by appropriately changing the frequency at which the PWM power signal 524 oscillates, either with a trapezoidal or sinusoidal like waveform. By properly adjusting the frequency to synchronize correctly with the rotational movement of the actuator 306, a higher energy efficiency is achieved, resulting in longer runtimes and quieter operations. Note that the controller 304 may determine the rotational speed of the actuator 306 via sensor data 526 received from the actuator 306 (e.g., via a Hall effect sensor) or using other techniques, such as through the detection of back-EMF.

The sensor data 526, if it exists, may also provide other information back to the controller 304, such as the temperature of the actuator 306, current torque, drag measurements, and so on. In some cases the controller 304 may also be able to send control data 522 to the actuator 306, which may instruct the actuator 306 to perform differently according to different adjustable parameters. For example, the controller 304 may instruct the actuator 306 to enter a high torque mode.

Example Adaptive Rate Determination

Figure 6:
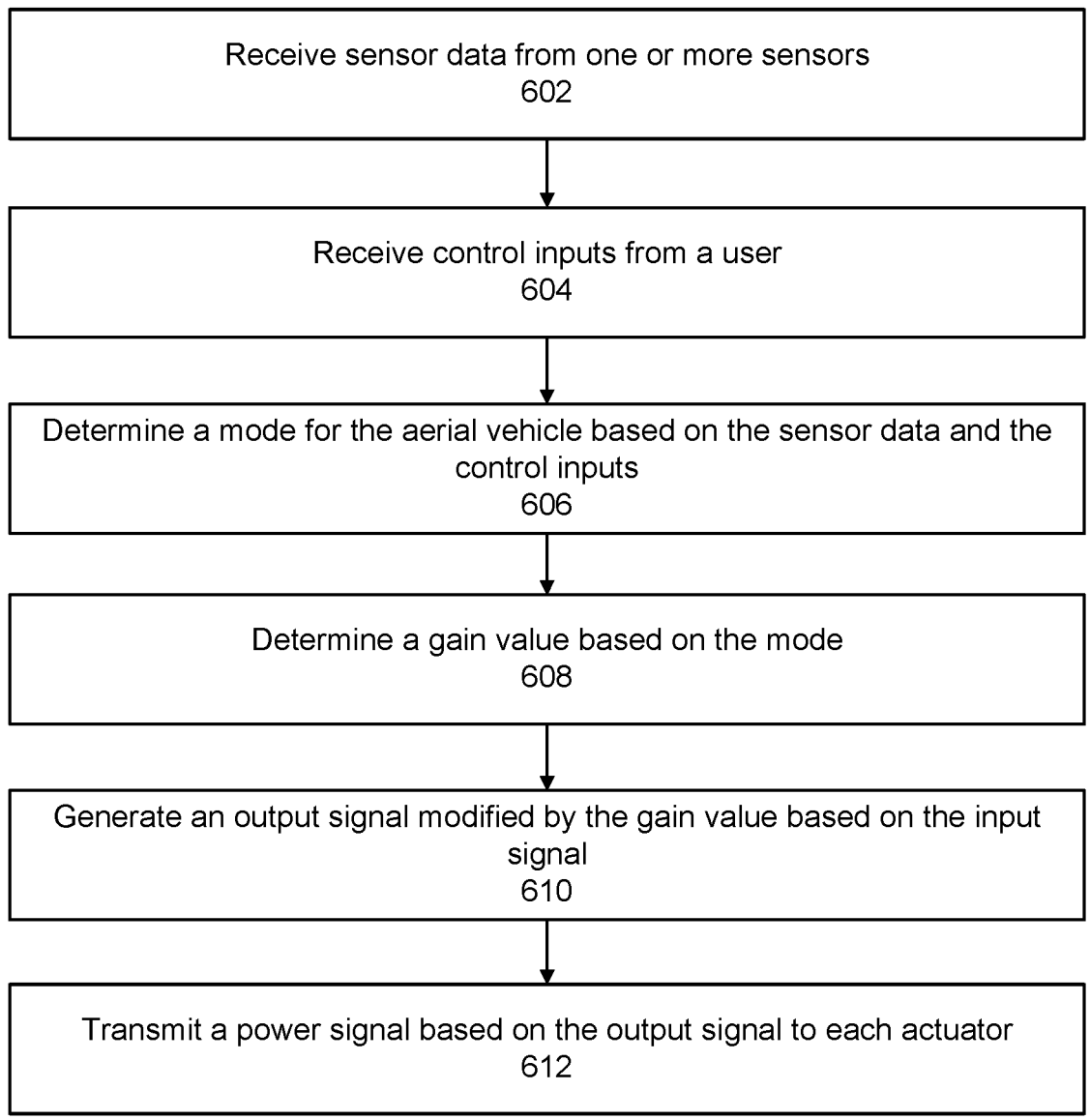
FIG. 6 illustrates a flow diagram of a method of adaptive gain value determination, according to one example embodiment.

FIG. 6 illustrates a flow diagram of a method of adaptive gain value determination, according to one example embodiment. In one embodiment, the method described in FIG. 6 may be executed by the controller of the aerial vehicle 110 described herein (e.g., controller 304, or flight controller 215). The controller may represent any of the individual controllers described previously, such as the position controller 334, velocity controller 338, etc. Alternatively, the controller may represent a combination of these previously described individual controllers, such that the function of the previously described controllers, along with other functions and components of the flight processing pipeline of the aerial vehicle 110, are combined into a single controller for the purposes of this description. For example, such an element may be controller 304 of FIG. 3A.

The controller may receive 602 sensor data from one or more sensors of the aerial vehicle. This environmental data may include temperature data, position data, imaging system modes, and so on.

The controller may receive 604 control inputs from a user. This control input defines movement of the aerial vehicle in three dimensions, and includes input provided by the user via a remote controller device, or via another external electronic device, such as a smartphone. This control input may also include, in some embodiments, control input generated by the controller itself, such as for autopilot maneuvers.

The controller may determine 606 a mode for the aerial vehicle based on the sensor data and control inputs. The mode defines a set of flight characteristics, such as limiting acceleration to a certain value. The controller, after determining the mode, attempts to conform the aerial vehicle to the flight characteristics indicated in the mode.

The controller may determine 608 a gain value based on the mode. The gain value may be previously stored for the mode. The gain value is determined, such that when used to modify the power signal to the actuators of the aerial vehicle, cause the aerial vehicle to conform to the flight characteristics indicated by the mode. For example, the gain value may be set so that the acceleration of the aerial vehicle does not exceed a maximum.

The controller may generate 610 an output signal modified by the gain values based on the input signal. In one embodiment, the gain values are modified based on the feedback of the aerial vehicle. These signals may be digital or analog.

The controller may transmit 612 a power signal (e.g., a three-phase sinusoidal PWM signal) to each actuator of the aerial vehicle in order to drive the propellers attached to each actuator. The power signal is generated based on the output signal, and thus in turn is based on the gain value. The power signal to each actuator may be different in order to achieve the desired movement in the aerial vehicle that conforms to the control input.

Example Machine Architecture

As has been noted, the remote controlled aerial vehicle 110 may be remotely controlled from the remote controller 120. The aerial vehicle 110 and the remote controller 120 are machines that may be configured and/or operated using software. FIG. 7 is a block diagram illustrating components of an example machine able to read instructions from a machine-readable medium (e.g., a non-transitory computer-readable storage medium) and execute them in one or more processors (or controllers). All or portions of the example machine described in FIG. 7 can be used with the aerial vehicle 110 or the remote controller 120 and/or other parts of a system that interfaces with the aerial vehicle 110 and/or remote controller 120. For example, the controller 304 including the pipeline 310 may be a part of the flight controller 215 of the aerial vehicle 110, and the flight controller 215 may be a machine/computer system similar to the example machine illustrated in FIG. 7.

In FIG. 7 there is a diagrammatic representation of a machine in the example form of a computer system 700. The computer system 700 can be used to execute instructions 724 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine in this example is a handheld controller to control the remote controlled aerial vehicle. However, the architecture described may be applicable to other computer systems that operate in the system of the remote controlled aerial vehicle with camera and mounting configuration, e.g., in setting up a local positioning system. These other example computer systems include a server computer, a client computer, a personal computer (PC), a tablet PC, a smartphone, an internet of things (IoT) appliance, a network router, switch or bridge, or any machine capable of executing instructions 724 (sequential or otherwise) that specify actions to be taken by that machine. Further, while only a single machine is illustrated, the term "machine" shall also be taken to include any collection of machines that individually or jointly execute instructions 724 to perform any one or more of the methodologies discussed herein.

The example computer system 700 includes one or more processing units (generally processor 702). The processor 702 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. In one embodiment, the processor 702 is any of the controllers previously described, for example, position controller 334, velocity controller 338, and so on. The computer system 700 also includes a main memory 704. The computer system may include a storage unit 716. The processor 702, memory 704 and the storage unit 716 communicate via a bus 708.

In addition, the computer system 700 can include a static memory 706, a screen driver 710 (e.g., to drive screen, e.g., 170, such as a plasma display panel (PDP), a liquid crystal display (LCD), or a projector). The computer system 700 may also include input/output devices, e.g., an alphanumeric input device 712 (e.g., a keyboard), a dimensional (e.g., 2-D or 3-D) control device 714 (e.g., a mouse, a trackball, a joystick, a motion sensor, or other pointing instrument), a signal generation device 718 (e.g., a speaker), and a network interface device 720, which also are configured to communicate via the bus 708.

The storage unit 716 includes a machine-readable medium 722 on which is stored instructions 724 (e.g., software) embodying any one or more of the methodologies or functions described herein. The instructions 724 may also reside, completely or at least partially, within the main memory 704 or within the processor 702 (e.g., within a processor's cache memory) during execution thereof by the computer system 700, the main memory 704 and the processor 702 also constituting machine-readable media. The instructions 724 may be transmitted or received over a network 726 via the network interface device 720.

While machine-readable medium 722 is shown in an example embodiment to be a single medium, the term "machine-readable medium" should be taken to include a single medium or multiple media (e.g., a centralized or distributed database, or associated caches and servers) able to store the instructions 724. The term "machine-readable medium" shall also be taken to include any medium that is capable of storing instructions 724 for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

In the controller system described above, modules of the same type may execute in parallel while modules of different types may execute in sequence. Executing modules of the same type in parallel advantageously may enable a processing time of the system (e.g., the controller 304 including the pipeline 310) to be reduced by executing modules of the same type in parallel, and may further enable some of the modules to execute while others wait for one or more system resources. In one example, a multi-core architecture including two controllers (e.g., two controllers 304) in parallel may execute twice as fast if executed in parallel than in sequence. In another example, if two controllers (e.g., two controllers 304) are using a hardware action or a graphics processing unit (GPU) to execute vector instructions, then both of the controllers may take processing (or execution) time from one another while the other controller is pending on the hardware action. Organizing the modules of the controller system in the pipeline may advantageously enable the modules to take input synchronously from a preceding module and output one or more signals synchronously to a following module. In addition, the pipeline may advantageously enable each of the modules to have a constant execution time and thus the pipeline may have an overall constant execution time.

A preemptive priority based scheduler may be used to schedule an execution time for each module in the pipeline. Scheduling the execution time for each module may advantageously enable the controller to execute low priority tasks/modules without adversely affecting execution of high priority tasks/modules.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1 through 7. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 702, that are temporarily configured (e.g., by software (or program code)) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment," "one example embodiment," or "an embodiment" means that a particular element, feature, structure, or characteristic described in connection with the embodiment is included in at least one embodiment. The appearances of the phrase "in one embodiment" or "in one example embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative modules a controller through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. An aerial vehicle, comprising:
   one or more sensors configured to collect environmental data;
   a communication system configured to receive control inputs from a user;
   two or more actuators, each actuator coupled to a rotary wing and configured to control the aerial vehicle;

an angle controller;
a rate controller;
a camera;
a memory comprising stored instructions executable by the angle controller to cause the angle controller to:
determine a mode of the aerial vehicle based on the environmental data and the control inputs, each mode indicating a set of flight characteristics for the aerial vehicle,
generate one or more adaptive gain values based on the determined mode and a scaling function that corresponds to the determined mode, the scaling function comprising a first function as a previous scaling function output plus a second function as a combination of feedback from the rate controller regarding a thrust vector and additional feedback including feedback from the one or more sensors, the one or more adaptive gain values being generated during operation of the aerial vehicle, the one or more adaptive gain values, when used to modify power signals transmitted to actuators of the aerial vehicle, causing the aerial vehicle to conform within the indicated set of flight characteristics of the determined mode, and
generate a rate set point signal modified by the one or more adaptive gain values based on an angle set point signal; and
the memory comprising stored instructions executable by the rate controller to cause the rate controller to:
generate a power signal based on the rate set point signal, and
transmit the power signal to each actuator of the aerial vehicle.

2. The aerial vehicle of claim 1, wherein the memory stores further instructions that when executed by the angle controller causes the angle controller to:
generate one or more gain value coefficients to modify proportional, integral, and derivative terms of a proportional, integral, derivative (PID) function of the angle controller, the PID function used to determine a rate of change of the rate set point signal in response to the angle set point signal.

3. The aerial vehicle of claim 1, wherein the memory stores further instructions that when executed by the angle controller causes the angle controller to:
recursively scale the one or more adaptive gain values based on the previous scaling function output at a previous point in time modified by the rate feedback of the rate set point signal at a current time.

4. The aerial vehicle of claim 1, wherein the memory stores further instructions that when executed by the angle controller causes the angle controller to:
continuously adjust at least one gain value of the one or more adaptive gain values to cause the aerial vehicle to conform to the flight characteristics.

5. The aerial vehicle of claim 1, wherein the memory stores further instructions that when executed by the angle controller causes the angle controller to:
determine that the determined mode is an adverse weather mode; and
set the one or more adaptive gain values to a minimum gain value based on desired flight characteristics for the adverse weather mode such that stable flight for the aerial vehicle is maintained.

6. The aerial vehicle of claim 5, wherein the memory stores further instructions that when executed by the angle controller causes the angle controller to:

determine that the determined mode is the adverse whether mode responsive to a detection of the control inputs indicating no user input, and the environmental data indicating movement of the aerial vehicle beyond a threshold level.

7. The aerial vehicle of claim 1, wherein the memory stores further instructions that when executed by the angle controller cause the angle controller to:
determine that the determined mode is a moving mode; and
set the one or more adaptive gain values to a maximum gain value based on desired flight characteristics for the moving mode such that stable flight for the aerial vehicle is maintained.

8. The aerial vehicle of claim 7, wherein the memory stores further instructions that when executed by the angle controller causes the angle controller to:
determine that the determined mode is the moving mode responsive to a detection of the control inputs indicating a standby state for the aerial vehicle.

9. The aerial vehicle of claim 1, wherein the power signal is a three-phase sinusoidal pulse width modulation power signal.

10. The aerial vehicle of claim 1, wherein the two or more actuators are brushless DC thrust motors structured to capture rotational energy from the rotary wings by reducing rotational speed of the rotary wings.

11. A method in an aerial vehicle, the method comprising:
determining, via an angle controller of the aerial vehicle, a mode of the aerial vehicle based on environmental data received from one or more sensors of the aerial vehicle and based on control inputs received from a user, each mode indicating a set of flight characteristics for the aerial vehicle; and
generating, via the angle controller, one or more adaptive gain values based on the determined mode and a scaling function that corresponds to the determined mode, the scaling function comprising a first function as a previous scaling function output plus a second function as a combination of feedback from the rate controller regarding a thrust vector and additional feedback including feedback from the one or more sensors, the one or more adaptive gain values being generated during operation of the aerial vehicle, the one or more adaptive gain values, when used to modify power signals transmitted to actuators of the aerial vehicle, cause the aerial vehicle to conform within the indicated set of flight characteristics of the determined mode;
generating, via the angle controller, a rate set point signal modified by the one or more adaptive gain values based on an angle set point signal; and
transmitting, via a rate controller of the aerial vehicle, a power signal generated based on the rate set point signal to each actuator of the aerial vehicle to induce a movement in a rotary wing coupled to each actuator.

12. The method of claim 11, wherein one or more adaptive gain values coefficients generated modify proportional, integral, and derivative terms of a proportional, integral, derivative (PID) function of the angle controller, the PID function used to determine a rate of change of the rate set point signal in response to the angle set point signal.

13. The method of claim 11, wherein the one or more adaptive gain values are further scaled recursively based on the previous scaling function output at a previous point in time modified by the rate feedback of the rate set point signal at a current time.

14. The method of claim 11, wherein the one or more adaptive gain values are continuously adjusted to cause the aerial vehicle to conform to the flight characteristics.

15. The method of claim 11, wherein the determined mode is an adverse weather mode, and wherein desired flight characteristics for the adverse weather mode sets the one or more adaptive gain values to a low gain value that conforms the aerial vehicle to stable flight.

16. The method of claim 15, wherein the adverse weather mode is determined by the control inputs indicating no user input, and the environmental data indicating movement of the aerial vehicle beyond a threshold level.

17. The method of claim 11, wherein the determined mode is a moving mode, and wherein desired flight characteristics for the moving mode sets the one or more adaptive gain values to a high gain value that conforms the aerial vehicle to stable flight.

18. The method of claim 17, wherein the moving mode is determined by the control inputs indicating the aerial vehicle is in a standby state.

19. The method of claim 11, wherein the power signal is a three-phase sinusoidal pulse width modulation power signal.

20. The method of claim 11, wherein the actuators are brushless DC thrust motors structured to capture rotational energy from each rotary wing by reducing rotational speed of each rotary wing.

* * * * *